United States Patent
Kanematsu et al.

(10) Patent No.: US 6,788,434 B1
(45) Date of Patent: Sep. 7, 2004

(54) IMAGE DATA PROCESSING METHOD AND IMAGE DATA TRANSFER METHOD

(75) Inventors: Daigoro Kanematsu, Kawasaki (JP); Kentaro Yano, Yokohama (JP); Kiichiro Takahashi, Kawasaki (JP); Hitoshi Nishikori, Inagi (JP); Masao Kato, Kawasaki (JP); Minako Kato, Yokohama (JP); Mitsuhiro Ono, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/568,854

(22) Filed: May 11, 2000

(30) Foreign Application Priority Data

May 11, 1999  (JP) .......................................... 11/130485

(51) Int. Cl.[7] ................................................ H04N 1/50
(52) U.S. Cl. ........................................ 358/1.9; 358/1.4
(58) Field of Search ...................... 358/1.9, 504, 406, 358/468, 1.2, 1.4, 3.2, 1.13, 3.06–3.08

(56) References Cited

U.S. PATENT DOCUMENTS

| | | | | |
|---|---|---|---|---|
| 5,508,826 A | * | 4/1996 | Lloyd et al. ................. | 358/501 |
| 6,076,915 A | * | 6/2000 | Gast et al. ..................... | 347/19 |
| 6,585,340 B1 | * | 7/2003 | Borrell ......................... | 347/14 |

FOREIGN PATENT DOCUMENTS

| | | | |
|---|---|---|---|
| EP | 0346647 | 12/1989 | |
| EP | 0532248 | 3/1993 | |
| JP | 05-220977 A | 8/1993 | |
| JP | 5220977 | 8/1993 | ............ B41J/2/205 |
| WO | 98/40222 | 9/1998 | |

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

An image data transfer method for transferring image data to a recording device for effecting an image recording in accordance with the image data using a recording head having a plurality of recording elements, said method, includes a step of simulating a recording operation of the recording device in accordance with a predetermined condition; a step of providing correspondence between raster lines of the image data and recording elements to be used for recording the raster lines on the basis of a result of said simulating step; a step of effecting an image processing the image data for each raster lines having been made to correspond to the recording elements by said correspondence providing step; a step of transferring the image data having been subjected to the image processing to the recording device.

30 Claims, 25 Drawing Sheets

FIG. 13A — ONLY BLK

FIG. 13B — COLOR-MIXED

FIG. 16A — ONLY BLK

| | |
|---|---|
| K1 | |
| K2 | |
| K3 | |
| K4 | 1ST SCAN PRINT |
| K5 | |
| K6 | |
| K7 | |
| K8 | |
| K9 | |
| K10 | |
| K11 | |
| K12 | |
| K13 | |
| K14 | |
| K15 | |
| K16 | |
| K1 | |
| K2 | |
| K3 | |
| K4 | 2ND SCAN PRINT |
| K5 | |
| K6 | |
| K7 | |
| K8 | |
| K9 | |
| K10 | |
| K11 | |
| K12 | |
| K13 | |
| K14 | |
| K15 | |
| K16 | |
| K1 | |
| K2 | |
| K3 | |
| K4 | 3RD SCAN PRINT |
| K5 | |
| K6 | |
| K7 | |
| K8 | |
| K9 | |
| K10 | |
| K11 | |
| K12 | |
| K13 | |
| K14 | |
| K15 | |
| K16 | |

FIG. 16B — COLOR-MIXED

| | |
|---|---|
| K1 | |
| K2 | |
| K3 | |
| K4 | 1ST SCAN PRINT |
| K5 | |
| K6 | |
| K7 | |
| K8 | |
| K9 | |
| K10 | |
| K11 | |
| K12 | |
| K13 | |
| K14 | |
| K15 | |
| K16 | ← BNDRY OF BLK |
| K7 | |
| K8 | ← TOP RSTR OF COLOR IMAGE |
| K9, C1 | |
| K10, C2 | 2ND SCAN PRINT |
| K11, C3 | |
| K12, C4 | |
| K13, C5 | |
| K14, C6 | |
| K15, C7 | |
| K16, C8 | } NOTED LINE |
| K9, C1 | ← BNDRY OF COLOR-MIXED |
| K10, C2 | |
| K11, C3 | 3RD SCAN PRINT |
| K12, C4 | |
| K13, C5 | |
| K14, C6 | |
| K15, C7 | |
| K16, C8 | |
| K9, C1 | 4TH SCAN PRINT |
| K10, C2 | |
| K1 | |
| K2 | |
| K3 | |
| K4 | 5TH SCAN PRINT |
| K5 | |
| K6 | |
| K7 | |
| K8 | |
| K9 | |
| K10 | |
| K11 | |
| K12 | |

FIG. 25

IMAGE DATA PROCESSING METHOD AND IMAGE DATA TRANSFER METHOD

FIELD OF THE INVENTION AND RELATED ART

The present invention relates to an image data processing method for processing data to produce image data to be supplied to a recording device for effecting image recording in accordance with image data using a recording head having a plurality of recording elements, an image data transfer method for transferring the image data, and a recording material for executing the methods.

Image forming apparatuses for recording on a recording material such as paper, an OHP sheet use various recording type heads. The types of the recording heads include a wire dot type, a thermosensitive type, a thermal transfer type, an ink jet type or the like. Among them, the ink jet type is widely used in the fields of printer, facsimile machine, copying machine or the like because of the advantages in the low noise, the low running cost, the small size, the easiness in use for color printing.

The recording head of the ink jet recording apparatus includes a plurality of ink ejection outlets (nozzles) arranged in a direction parallel to the feeding direction of the recording material, and ink droplets are ejected through the ejection outlets.

In an ink jet recording apparatus using the recording head having a plurality of nozzles, the ejection performances of the nozzles become different from each other due to elapse of time or due to manufacturing error with the result of unevenness of density which may be stripes, in the printed image.

In order to solve the problem, Japanese Laid-open Patent Application No. HEI 5-220977 has proposed that density correction data are prepared for each nozzle, on the basis of which a raster signal for the original image is corrected in the density for each nozzle, so that density non-uniformity and stripes of the image are avoided (head shading method).

The head shading disclosed in Japanese Laid-open Patent Application No. HEI 5-220977 is employed in a copying machine image an original image read from an original document by a reading apparatus is printed on a recording material by an ink jet recording apparatus, but the method can be incorporated in a printer system. Generally in a printer system, a host computer obtains multi-level image data from various image file or application, and a printer driver converts the data into binary image data, which is supplied to a printer, which in turn prints the corresponding image in accordance with the image data.

Therefore, when the host computer, more particularly, the printer driver is provided beforehand with the property of the recording head of the printer, that is, the density correction data, the printer driver can correct the multi-level image data in the image density in accordance with the properties of the recording head before conversion to binary image data.

On the other hand, the printer system carries out various operations for high speed printing and for high image quality printing. For example, a high image quality printing is accomplished by a so-called multi-path printing. In this system, the distance or amount of paper feeding corresponds to 1/n multiplied by the number of used nozzles, and the main-scanning printing is effected n times with data which have been complementarily thinned to 1/n so that one raster line is printed using a plurality of (n) nozzles. The multi-path printing is effective to suppress the error of the paper feeding, the differences in the ejection properties of the nozzles (quantities of the ejected liquid, the directions thereof), the unevenness in the darkness due to the differences in the ink absorbing speed attributable to the paper material property, so that image quality is improved.

As for an example of high speed recording, a so-called null skip is known. The printer having received the image data simply feeds the sheet without effecting the main-scanning operation of the recording head for the raster line having no print image data, thus speeding the printing operation.

However, the head shading method is not usable, as it is, with the printer using the multi-path printing or null skip system, since in the head shading method, the density correction is carried out on the basis of simple correspondence between the nozzles and the image data using the density correction data for the nozzles.

In the multi-path printing, the 1raster line is covered by a plurality of nozzles. In the head shading method a density correction table is prepared for each nozzle in accordance with each of the properties of the nozzle. If this correction system is used as it is, the density correction for each raster line is effected using a density correction table for a certain one nozzle despite the facts that 1raster line is printed by a plurality of nozzles with the result that density correction table does not match the actually used nozzle, and therefore, the object of improving the image quality is not accomplished.

On the other hand, when the printer effects the null skip on the basis of the binary image data after the density correction, the image data which have been subjected to the density correction are printed by a nozzle different from the nozzle for which the correction has been made, that is, the correction does not match the actual printing nozzle. Moreover, the original image is not faithfully reproduced. More particularly, a raster line which is not a null line before the density correction, may become a null line by the binarization process or by the density correction. If the null skip is carried out for such a raster line, the above-described inconvenience arises.

The problem may be solved by supplying the multi-level image data from the printer driver to the printer and by the printer effecting the density correction in accordance with the properties of the recording head. However, such a method results in that multi-level image data are supplied to the printer of the printer driver so that time required for transmitting the image data becomes longer, and that density correction and the binarization process are effected in the printer. Therefore, it is not practical.

SUMMARY OF THE INVENTION

Accordingly, it is a principal object of the present invention to provide an image data processing method and an image data transfer method capable of permitting high image quality recording despite various operations carried out by the recording device, and a recording material storing a control program therefor.

According to an aspect of the present invention, there is provided an image data transfer method for transferring image data to a recording device for effecting an image recording in accordance with the image data using a recording head having a plurality of recording elements, said method comprising a step of simulating a recording operation of the recording device in accordance with a predetermined condition; a step of providing correspondence between raster lines of the image data and recording elements to be used for recording the raster lines on the basis of a result of said simulating step; a step of effecting an image processing the image data for each raster lines having been made to correspond to the recording elements by said correspondence providing step; a step of transferring the image data having been subjected to the image processing to the recording device.

According to this aspect of the present invention, the recording operation of the recording device corresponding to the multi-path printing, the null raster skip, the color containing image printing, black-color image printing, the break image, the operation against the change of the ambient condition or the like are simulated, and then on the basis of the result of simulation, the raster lines of the image data are made correspond to the recording elements, and the image data for the raster lines corresponding to the recording elements are subjected to be image processing, and the image data thus processed are transmitted to the recording device.

These and other objects, features and advantages of the present invention will become more apparent upon a consideration of the following invention taken in conjunction with the accompanying drawings.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 13 is a schematic view of a specific example in which image data containing a mixture of a black line and a black-color line, is stimulated, using the recording head of FIG. 12.

FIG. 16 is a schematic view of a specific example in which the image data containing a mixture of a black line and a black-color line is simulated, using a recording head of FIG. 15.

FIG. 18 is a schematic view of a specific example in which the image data containing a mixture of a black line and a black-color line is simulated, using a recording head of a FIG. 17.

FIG. 21 is a schematic view of a specific example in which the image data not containing a black-color boundary and the image data containing such a wandering are simulated.

FIG. 25 is a schematic view of a specific example in which the orders of ink ejections are different between in the forward printing and in the backward recording.

DESCRIPTION OF THE PREFERRED EMBODIMENTS

The description will be made as to the embodiments of the present invention in conjunction with the accompanying drawings.

Embodiment 1

Figure 1:
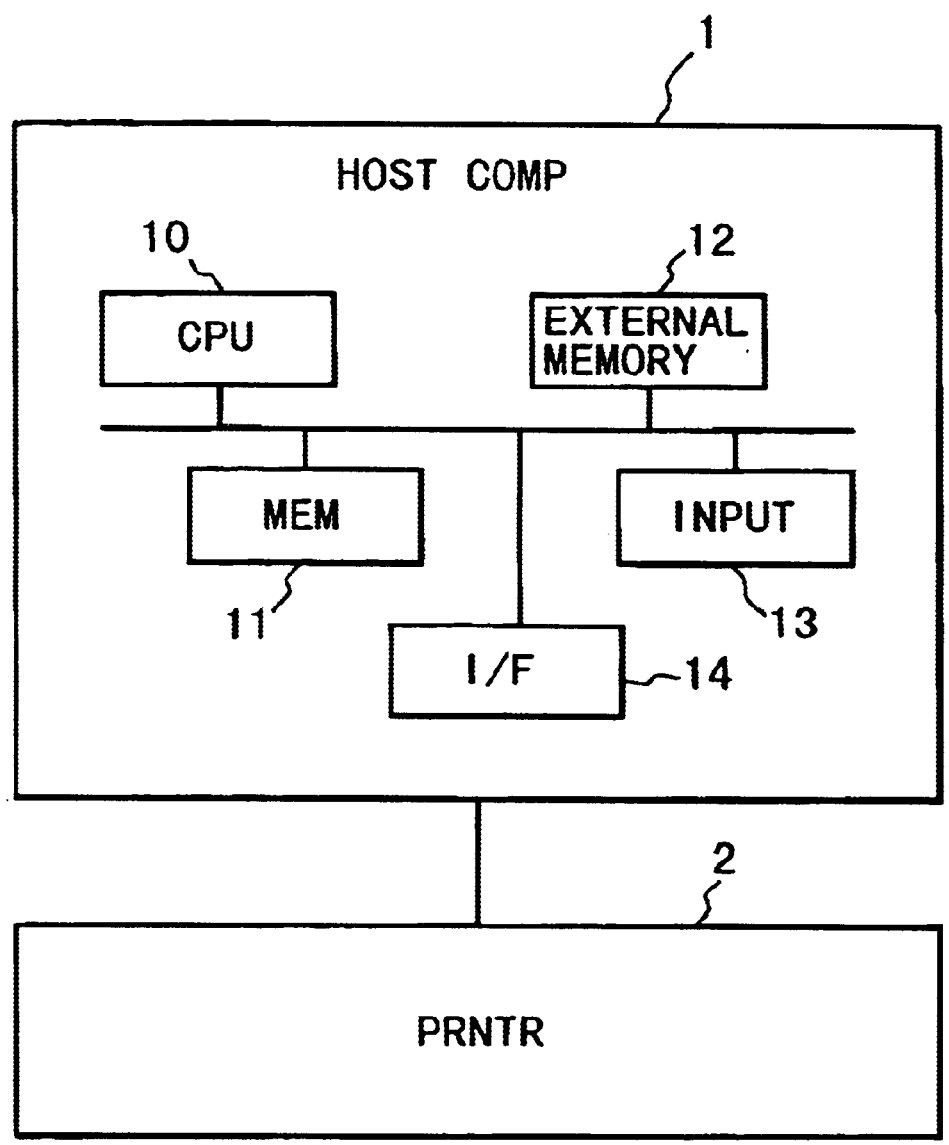
FIG. 1 is a block diagram illustrating a general arrangement of a system structure of a recording device using the present invention.

FIG. 1 shows a general arrangement of a system structure according to an embodiment of the present invention, in which the system comprises a host computer 1 (information processing device) and an ink jet recording apparatus 2 (printer).

As shown in FIG. 1, the host computer 1 comprises a cPu10, memory 11, an external storing portion 12 such as a hard disk, an input portion 13 such as a keyboard, mouse or the like, and an interface 14 for connection with the printer 2. The CPU10 functions to effect a color processing, a density correcting process, a quatitization (binarization) and other image processings to the original image data by executing a printing program stored in memory 11. The printing program is usually stored in an external storing portion 12 or supplied from an external device as a printer driver, and when printing instructions is produced by an application program, the printing program of the printer driver is supplied from the external storing portion 12 or the external device to the memory 11. The host computer 1 is connected with a printer 2 through an interface 14, and supplies image data having been subjected to the color processing, quatitization process in accordance with the printing program of the printer driver, to the printer 2 to execute the printing.

In this case, various image processings such as the rasterization process, color conversion process, output γ correction process, quatitization process, are carried out by the printer driver for the printer 2 set in the host computer 1, by which the original image data to be printed are converted by the host computer 1 to binary data of bit image which can be directly used by the recording head of the printer, and the converted data are output to the printer. Hereinafter, the various image processings executed by the host computer are called "host processing" functions.

Figure 2:
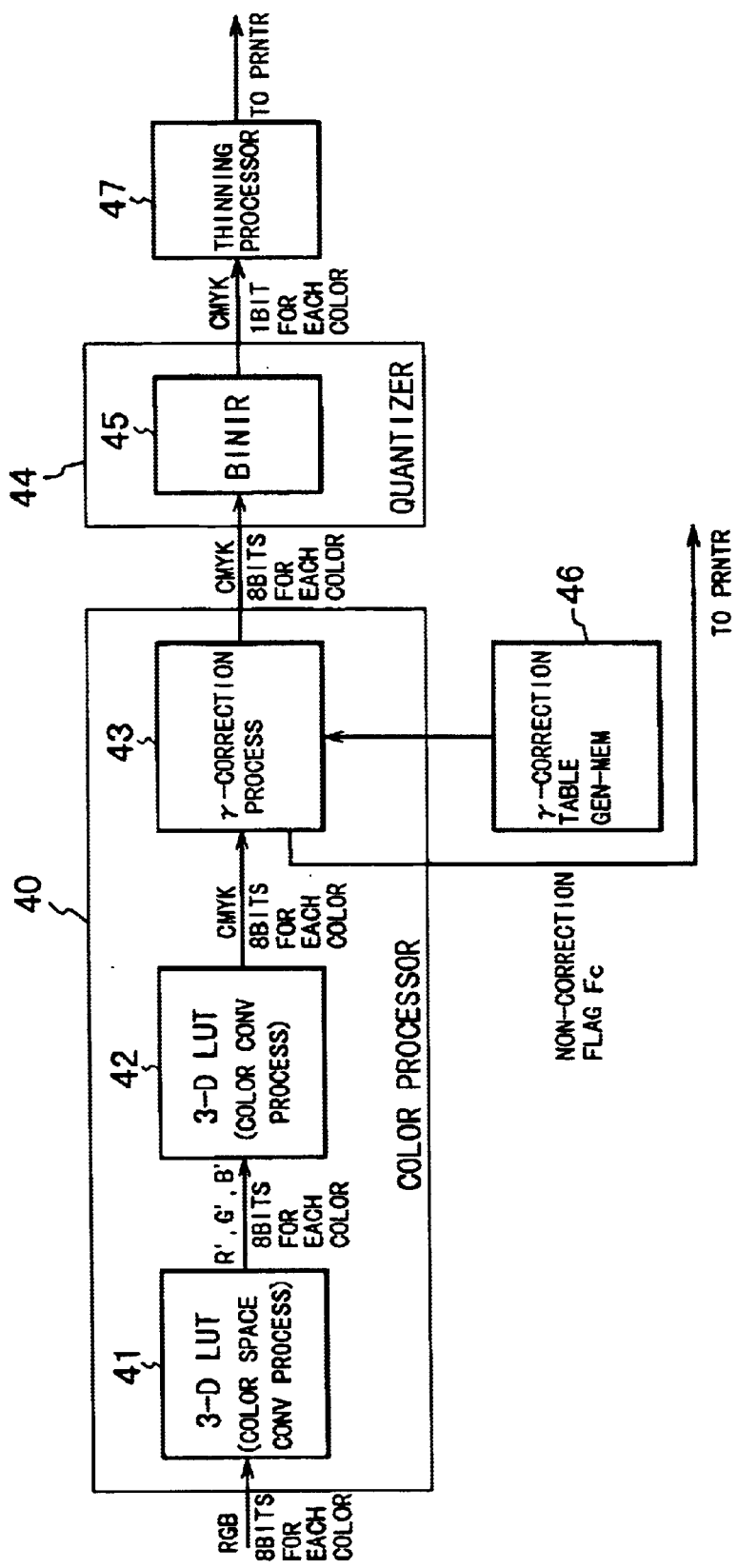
FIG. 2 is a block diagram showing a structure in a host computer, relevant to the present invention.

Referring to FIG. 2, the description will be made as to host processing of the host computer 1 side.

The host processing comprises a color processing executed by a color processor 40 and a binarization process executed by quatitization processor 44, and means the process in which original image date including 8 bit (256 tone gradation) data for each of R, G, B colors received from an application program or the like are converted to 1bit binary data for each of C, M, Y, K colors, and the converted data are outputted. In the case of multi-path printing, a thinning process corresponding to a multi-path number Np is carried out by a thinning processor 47. In the case of null skip operation, an output γ correction processor 43 gives to raster lines for which the density correction is not executed, that is, in which the raster line data before the density correction are all zero, non-correction flags Fc which is "ON" when no density correction is effected, corresponding to the raster line number in the data sent to the printer 1. This is because when a raster line becomes a null raster line after the density correction, the correction table has been assigned to the raster line, and therefore, an indication of the necessity of keeping the relationship between the subsequent raster lines and the nozzles, is necessary.

The color processor 40 is supplied with rasterized original image data which are 8bit data for each of R, G, B colors. The 8bit original image data for each of R, G, B colors are first converted to 8bit data of R', G' and B' by a color space conversion process (initial color processing) using a three-dimensional look-up table 41 (LUT). The color space conversion process is carried out to correct a difference between the color space (color space) of the input image and the reproduced color space of the output device.

The 8bit data R' G' B' having been subjected to the color space conversion process are converted to 8bit data for each of C (cyan), M (magenta) Y (yellow), K (black) colors using next three dimensional LUT42. The process is called color conversion process (later stage color processing) and is effective to convert the RGB system data of input system to CMYK system data of output system. That is, the later stage color processing converts the input data of 3basic color (RGB) based on additive color mixture to data of 3basic color (CMY) based on subtractive color mixture which is effective when the color is expressed by reflection of light as in the case of printers.

The three dimensional LUT41, 42 used in the initial color processing and the later stage color processing discretely hold the data, and a compensation process is used upon data output.

The 8bit C, M, Y, K data having been subjected to the later stage color processing are then subject to a density correcting process (output γ correction) by an output γ correction processor 43 having a one-dimensional LUT. The relationship between the number of print dots per unit area and the output density property (reflection density or the like) is normally not linear, and therefore, the linear relation between the C, M, Y, K 8bit input levels and the output properties are provided by the output γ correction.

The one-dimensional LUT sets and stores an optimum γcorrection table corresponding to the current printing mode (multi-path printing process mode, null skip process mode) by a γcorrection table generating/storing portion 46. The details thereof will be described hereinafter.

When the null skip is effected, the output γ correction processor 43 discriminates whether or not the raster lines are null (0 data) on the basis of the multi-level print data before the density correcting process, and in accordance with the result of the discrimination, it determines the raster lines for which the density correction is to be effected. As described hereinbefore, the data are outputted to the printer 2 with non-correction flags Fc indicative of non-density correction assigned in connection with the raster line numbers.

The C, M, Y, K 8bit multi-level data outputted for the color processor 40 are inputted to the binarization processor 45 of the quatitization processor 44. The binarization processor 45 quantitizes the inputted C, M, Y, K 8bit multi-level data into ibit binary data for C, M, Y, K colors, respectively, using a known error diffusion method.

The thinning processor 47 operates when the multi-path printing is to be carried out, and it thins the binary data for each raster line outputted from the binarization processor 45 in accordance with the duty corresponding to the multi-path number Np (for example, when the path number Np is 2, the duty is 50%), and the thinned data are divided into Np times and are outputted to the printer 2. The thinning process may be carried out by the printer 2.

Figure 3:
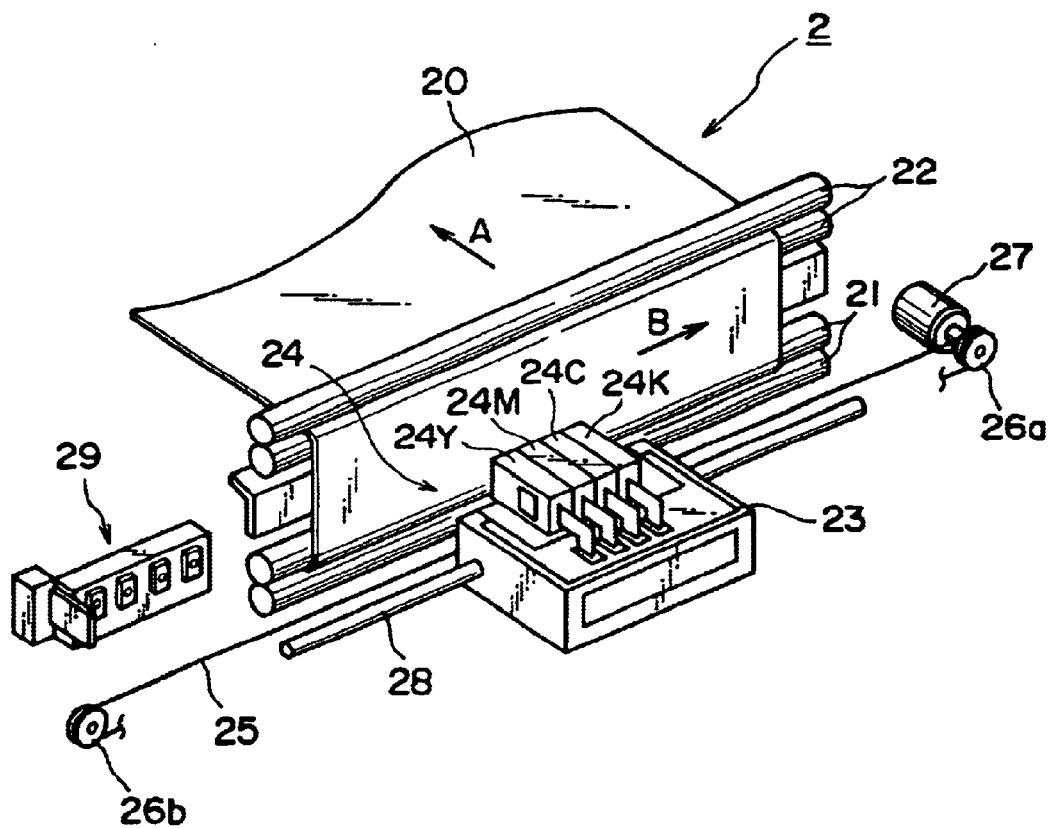
FIG. 3 is a perspective view showing a major mechanism of an ink jet recording apparatus.

FIG. 3 schematically shows the structure of a mechanical portion of the ink jet recording apparatus 2. A recording material 20 such as a paper, plastic resin material sheet or the like is supplied out one by one by a sheet feeding roller (unshown) and is fed in the direction indicated by an arrow A by a first pair of feeding rollers and a second pair of feeding rollers which are disposed at a predetermined interval therebetween. The pairs of rollers 21, 22 are driven by a stepping motor.

The carriage 23 is loaded with an ink jet type recording head 24 and an ink container (unshown). The recording head 24 is for color recording, and includes four heads, namely, heads 24Y, 24M, 24C, 24K correspondingly to yellow, magenta, cyan and black colors. The carriage 23 is connected with a carriage motor 27 through belt 25 and pulleys 26a, 26b, and the carriage 23 reciprocable in the direction of arrow B along a guiding shaft 28 by the carriage motor 27.

Each of the recording heads 24Y, 24M, 24C, 24K has a plurality of nozzles arranged in the direction parallel with the feeding direction A of the sheet (one array in this embodiment), and ink droplets are ejected through the nozzles. In this case, an electrothermal transducer is provided in each of the nozzles as thermal energy source, and the electrothermal transducer is activated so that film boiling is produced in the ink by which the ink is ejected.

With this structure, the recording head 24 ejects the ink onto the recording material 1 in accordance with the image signal while moving in the direction of arrow B so that ink image is formed on the recording material 20. When the recording head 24 returns to the home position, the recording head 24 is refreshed by a head therebetween provided at the home position so that nozzles are prevented from clogging.

The recovering device 29 is actuated at proper timing. After the recording which covers one band by one scan of the recording head 24, the sheet is fed by a predicament amount (pitch feeding) by the pairs of feeding rollers 21, 22. By repeating such operations, printing is effected on the recording material 20.

Figure 4:
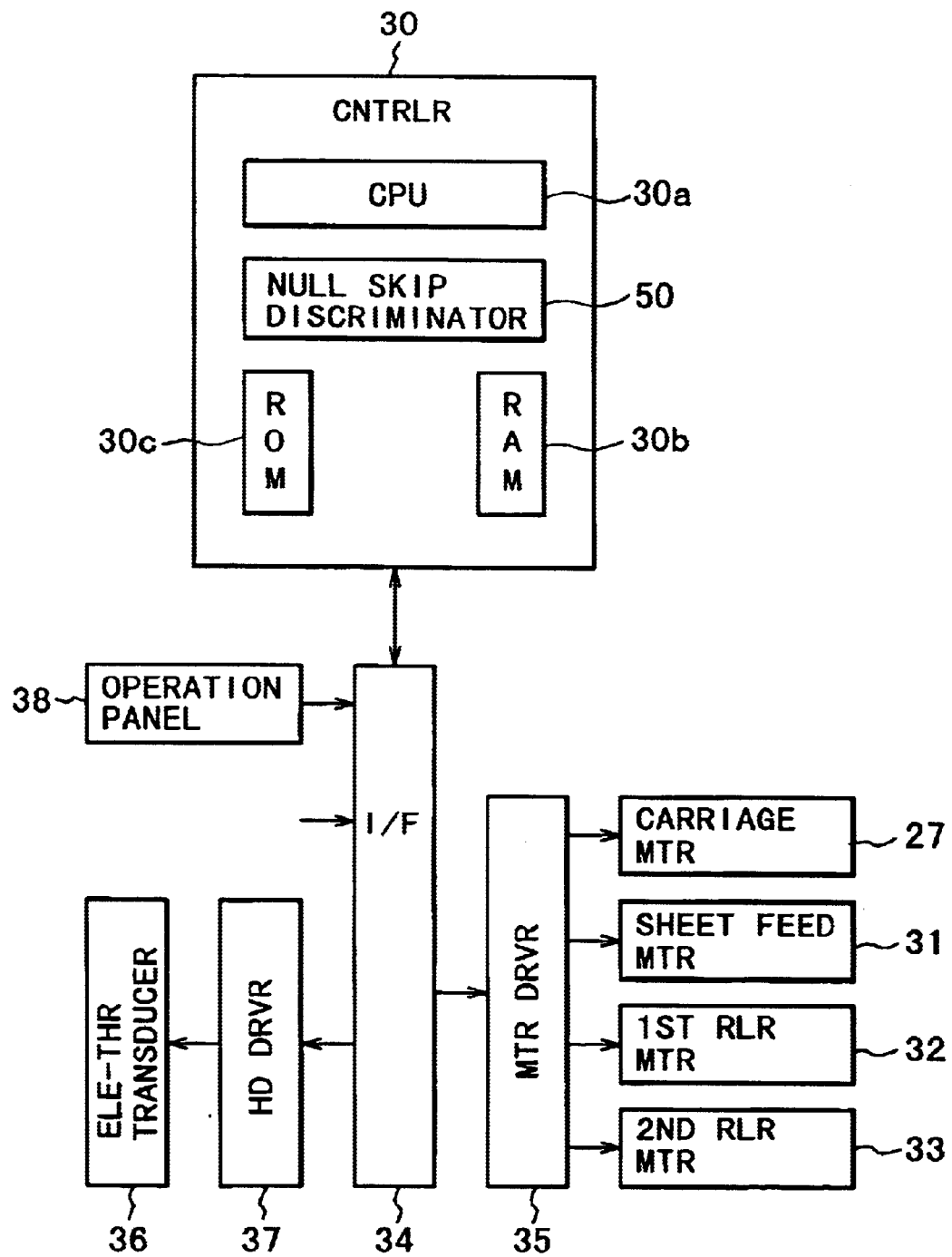
FIG. 4 is a block diagram showing an example of a structure of a control system of an ink jet recording apparatus.

Referring to FIG. 4, the description will be made as to the structure of a control system of the ink jet recording apparatus 2. The control system comprises a controller 30, which includes a CPU30$a$ in the form of a micro-processor for example, ROM30$c$ storing a control program for the CPU30$a$ and various data, and RAM30$b$ which is used as a work area for the CPU30$a$ and which is effective to temporarily store various data such as print data inputted from the host computer 1.

The ink jet recording apparatus 2 is provided with a plurality of motors including the carriage motor 27, the sheet feeding motor 31, the motor 32 for the first pair of the feeding rollers, the motor 33 for the second head of feeding rollers, and the motors are controlled by a controller 30 through an interface 34 and motor drive circuits 35.

The recording head 24 is provided with an electrical conversion element 36 for each nozzle to eject the ink from the nozzle, and the electrothermal transducer elements 36 are on-off-controlled in accordance with the image signals by the controller 30 through an interface 34 and a head drive circuit 37.

The controller 30 receives various printing information (letter pitch, font or the like) from the operation panel 38 through the interface 34 and also receives the print data from the host computer 1 through the interface 34.

The controller 30 of the printer 2 is provided with a null skip discriminator 50 for discriminating raster lines for which null skip is executed, on the basis of the binary print data and the non-correction flag supplied from the host computer 1. The null skip discriminator 50 makes its discrimination on the basis of the final binary print data which have been subjected to the density correcting process and the binarization process. It is possible that raster line which is not null before the density correcting process may become a null raster line as a result of the density correcting process or binarization. Therefore, the null skip discriminator 48 discriminates the raster line for which the null skip is executed on the basis of the final binary print data having been subjected to the density correcting process and the binarization process, and in the discrimination of the null skip, the non-correction flag Fc supplied from the host computer 1 is referred to. If the raster line line which was not null before the density correction and which became null after the density correcting process, is skipped, the plurality of density correction table prepared for the respective nozzles do not match the actual nozzles, and the original image are not faithfully reproduced. For this reason, such a raster line is not skipped.

The description will be made as to the pre-process carried out by the host computer 1 when the printer 2 effects a multi-path printing.

In order for the host computer 1 to simulate the multi-path printing executed by the printer 2, (a) the number Nn of all nozzles of the recording head of the ink jet recording apparatus 2 to which the computer is conducted, and (b) the number Np of the paths of the multi-path printing (the number of groups into which the recording head is divided), are to be known.

As regards the number of the total nozzles, the data indicative of the number Nn are stored in the printer 2 beforehand, and the computer fetches the stored data Nn from the printer 2. As regards the exchange of the ink container, there are a type in which only the ink container (cartridge) is exchanged and a type in which the recording head is exchanged. In the former type, the main assembly of the printer 2 stores the data indicative of the number Nn, and in the latter type, the recording head stores the data. As an alternative, a printer driver of the host computer 1 may be provided with a table storing information relating to the total number of the nozzles for respective printer types and/or recording head types, and the host computer 1 fetches the printer types and/or the recording head types produce printer and/or the recording head, by which the computer can obtain the total nozzle number of the printer 2.

As regards the multi-path number Np, it is determined by the direct or indirect selection by the user through a user interface (UI) screen of the printer driver of the host computer 1, and therefore, the host computer 1 already has the information thereon. Therefore, there is no need of communication with printer 2 in this respect. For example, on the screen for selecting the printing mode in the UI screen, the printing mode can be selecting from sentence/table, DTP printing, image process or the like, and the user selects the desired printing mode on the screen. In response to the selection, the multi-path number Np is definitely determined, for example, 1path, 2path, 4path or the like. The printer driver stores corresponding relations between the multi-path numbers Np and the printing modes, and selects the multi-path number Np corresponding to the selected printing mode, and controls the printer 2 to carry out the multi-path printing with the path number Np. As described hereinbefore, the thinning process and the amount of the paper feeding are determined by a printer driver. However, by notifying the printer 2 of the multi-path number Np, the printer 2 may determine the thinning process and the amount of paper feeding.

An output γ correction table of the multi-path printing is set in the following manner.

In the first system, the printer driver sets and store beforehand therein a standard correction table corresponding to combinations of all nozzle numbers Nn and path numbers Np for all types of printers which the printer driver covers, and selects a correction table corresponding to the information of the nozzle number Nn provided by the printer 2 and the information on the path number Np provided in the above-described manner.

In the second system, when the ink cartridge only is exchanged upon the exchange of the ink, the memory of the main assembly of the printer stores correction tables of the multi-path printing corresponding to the recording heads of the printer in accordance with the nozzle numbers Nn and the path numbers Np, beforehand (factory shipment). In the case of the type in which the recording head is also exchanged, the memory of the recording head module integrally having the ink container and the recording head correction tables for the multi-path printing of the recording head in accordance with the path numbers Np, beforehand (factory shipment). In the second system, the host computer 1 selects a correct correction table corresponding to the intended multi-path printing on the correction tables sport in the printer or the recording head, and receives the selected one from the printer 2.

In a third system, a plurality of different correction table having different correction data corresponding to the multi-path printing to be executed, using the above-described first or second system. Using the different correction data, the γcorrection is actually effected, and the multi-path printing is carried out using the result of the γcorrection to print test patterns corresponding to the γcorrection. Then, the user selects the test pattern exhibiting best print quality, and the correction table corresponding to selected test pattern is selected. In the third system, the γcorrection table can be changed after having been delivered from the factory so that change of the nozzle property with elapse of time can be corrected.

On the other hand, when the multi-path printing is carried out, the printer 2 controls actuation of the recording head on the basis of the binary print data which have been subjected to the density correction and the thinning process and which have been supplied from the host computer 1, and controls the feeding of the recording material so that sheet is said at a pitch of Nn/Np (the nozzle number divided by the path number).

The description will be made as to the pre-process executed in the host computer 1 to effect the density correction when the null skip is carried out.

In order to simulate the null skip to determine the algorithm of the output γ correction process, the host computer 1 needs to know the minimum skip raster line number of the ink jet recording device 2 connected with the host computer 1. The minimum skip line number may be one raster, 8 raster lines, the number of the nozzles of the recording head, nozzle number Nn divided by the raster number corresponding to the path number Np (in the case of multi-path printing). Therefore, the printer 2 stores the data relating to the skip line number m beforehand, and the stored data m is received from the printer 2. In the system in which the minimum skip line number corresponds one to one to the printing mode such as sentence/table print, DTP printing, image process or the like, it is not necessary to deceive the information on the minimum skip raster line number from the printer 2.

Since the output γ correction process upon the null skip is different depending on the minimum skip line number, the printer driver of the host computer 1 stores a program for the output γ correction process corresponding to the minimum skip line number m, and the host computer 1 executes the output γ correction process corresponding to the minimum skip line number m of the printer provided by the printer 2.

(Multi-path Printing Process)

The description will be made as to the density correcting process carried out by the host computer 1 and the multi-path printing process carried out by the printer 2. Here, one recording head is provided with 256 nozzles (Nn=256), and the multi-path printing is a 2 path printing (Np=2). Since the 2path printing is carried out with the 256nozzles, the first raster, that is, the first raster is printed by the first nozzle and the 128th nozzle, and the second raster is printed by the second nozzle and the first 129th nozzle and so on. Therefore, the density distribution resulting from the differences in the amounts of ejection and the dimensions of the ejection is periodical for each 128 raster lines.

Figure 5:
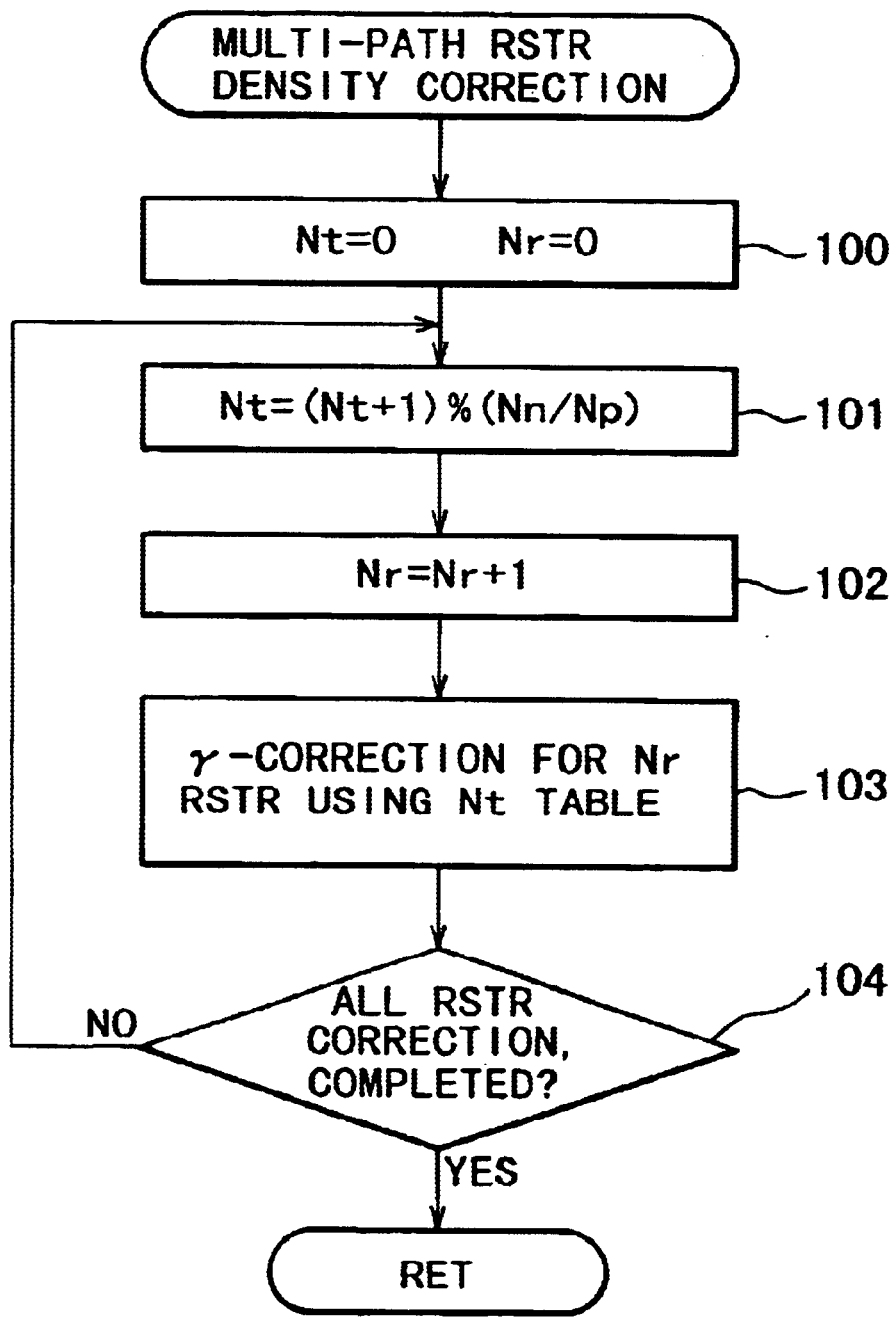
FIG. 5 is a flow chart illustrating a raster density correcting process effected by the host computer on the basis of a simulate of multi-path printing.

Referring to FIG. 5, the description will be made as to the density correcting process executed by the host computer 1 by simulation of the multi-path printing of the printer 2.

The output γ correction process is carried out by the output γ correction processor 43 shown in FIG. 4. Since in this example, the 2 path printing is carried out with the 256 nozzle, 128 correction tables of the 128 raster lines are said in the one-dimensional LUT for each of Y, M, C, K colors. Since the data for each of C, M, Y, K colors supplied to the correction processor 43 are 8 bit (256 tone gradation) multi-level data, the data in the one-dimensional LUT are 256 tone gradation multi-level data. The 128 correction tables includes a first correction table (table number Nt=1) for one raster line for both of the first nozzle and first29 nozzle, the first correction table having taken the ejection properties of both of the first nozzle and the first29 nozzle into account, a second correction table (table number Nt=2) similarly for both of the second nozzle and the first30 nozzle, a third correction table (table number Nt=3) similarly for both of the third nozzle and the first31 nozzle ..., a first28 correction table (table number Nt=128) for both of the first27 nozzle and the second56 nozzle.

The output γ correction processor 43 executes the correcting operation using the 128 correction tables.

First, the table number Nt and the raster line number Nr to be processed are initialized to 0. Then the table number Nt is incremented by 1 (step 101) using the following:

Nt=(Nt+1) % (Nn/Np)

Nn: the nozzle number (Nn=256)

Np: the path number (Np=2)

In the above equation, "%" means a remainder of division (Nt+1)/(Nn/Np), wherein the quotient is a natural number, and the formula is used to permit repetition of the sequential increment of the table number Nt from 1 to 128. In the above equation, Nt–0 at first, and therefore, Nt at the left side is 1.

Then, the raster line number Nr is incremented by +1 (step 102). Then, Nt=1, Nr=1 Therefore, the raster line data of raster line number Nr=1 is corrected in the output γ using the correction table for table number Nt=1 (step 103).

Then, the discrimination is made as to whether or not the density corrections having been completed for all the raster line data for 1 page, for example (step 104). At this stage, the result of discrimination at step 104 is negative, the process of steps 101 102 are reexecuted, and table number Nt and raster line number Nr are incremented by +1, and thereafter, the step 103 is executed. Then, the raster line data for raster line number Nr=2 are corrected in the output γ using the correction table for table number Nt=2.

The similar processes are executed so that 128 raster data (Nr=1–128) are corrected in the output γ using 128 different correction tables.

The table number Nt is incremented from 1 to 128 by step 101 and the raster line number Nr is simply incremented by +1 until the completion of the density correcting process is discriminated at step 104.

Therefore, the output γ correction is sequentially executed for the 128 raster data (Nr=129–256) using the same 128 correction tables. The same corrections are repeated until the completion of the density correcting operation for all of the raster line data, at step 104.

In this manner the data having been subjected to the output γ correction by the output γ correction processor 43 are binarized by the quatitization processor 44 and are subjected to the thinning process by the thinning processor 47 (in this example, 2 path printing is used, and therefore, thinning to ½ is effected), and then outputted to the printer.

Figure 6:
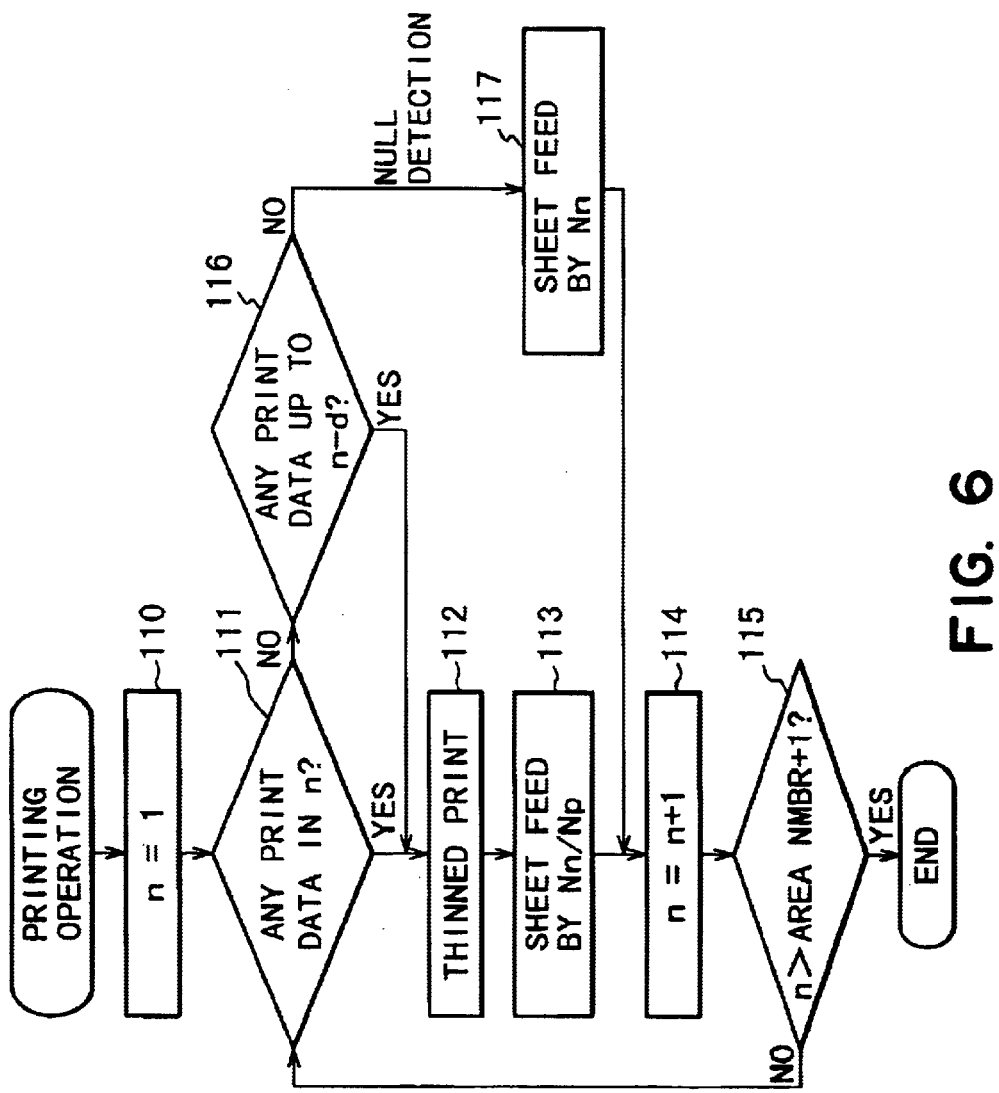
FIG. 6 is a flow chart illustrating a printing process operation carried out by a printer which is carrying out a multi-path printing operation.
Figure 7:
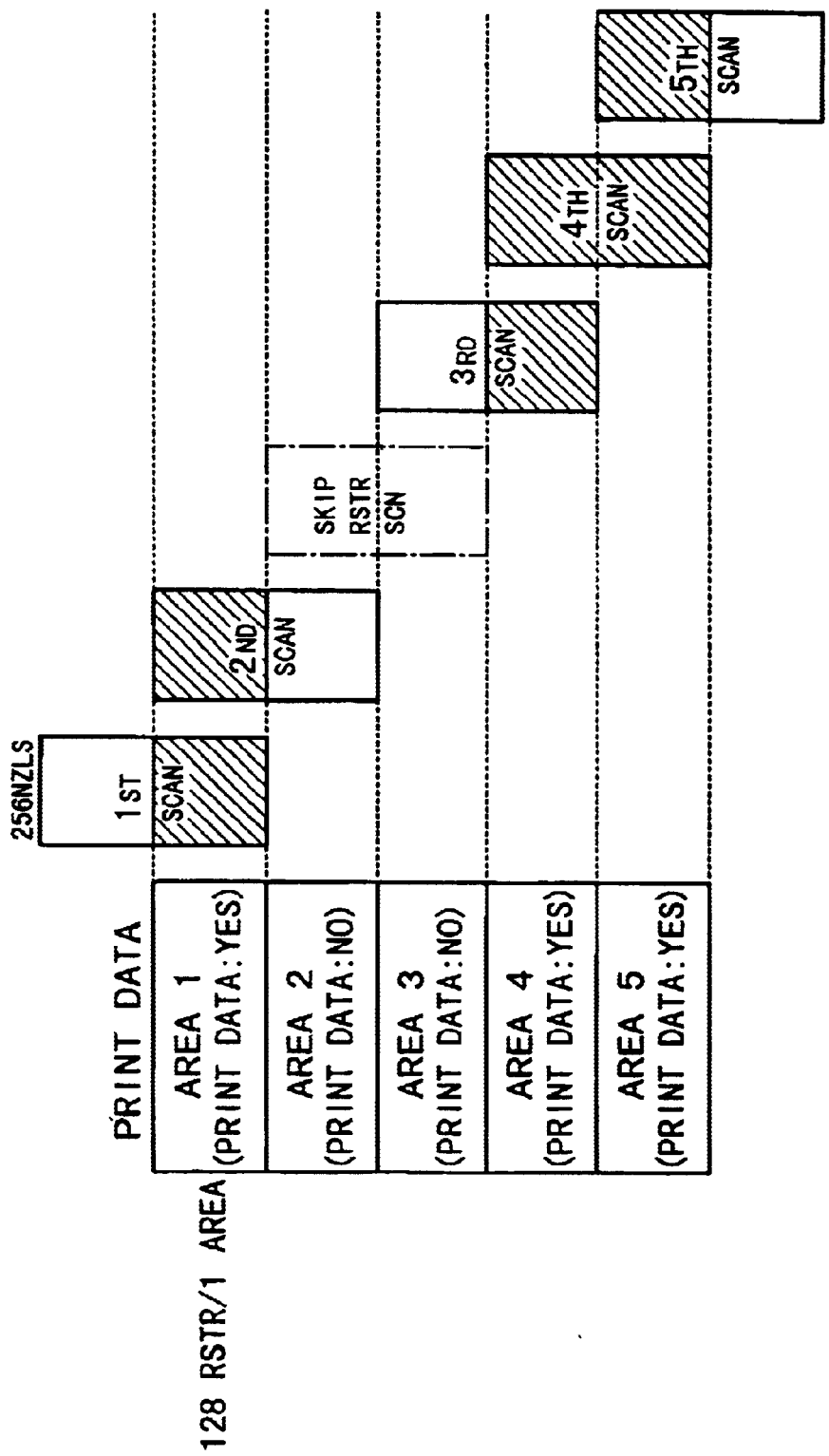
FIG. 7 is a schematic view showing a specific example of a multi-path printing process.

Referring to FIGS. 6 and 7, the description will be made as to the printing operation carried out in the printer 2. FIG. 6 shows process steps for the printing and feeding control executed by the controller 30 of the printer 2, and FIG. 7 schematically shows a specific example of the sheet feeding operation and the printing action.

The controller 30 of the printer 2 first reset the count n of the area counter to 1 (step 110). One area corresponds to one raster block corresponds to the nozzle number divided by path number, and in this example, one area corresponds to 128 raster line.

Subsequently, controller 30 checks the print data supplied from host computer 1 to discriminate whether or not there are print data in the region n designated by the count n of the area counter, in other words, whether or not the region 1 is all null. If the existence of the print data is discriminating, the scanning movement of the recording head is carried out to effect the printing operation for 256 nozzles (step 112). Upon completion of the printing operation, the sheet is fed by the distance corresponding to the current multi-path printing The 2 path printing is employed this time, and therefore, 1 pitch corresponds to 128 nozzles. Then, the area counter n is incremented by +1 (step 114).

On the other hand, if the result of discrimination at step 111 is indicative of non-existence of print data in the region n, the discrimination is made as to whether or not the print data exist in the areas up to n-d areas. Here, d=Np-1, and in the case of 2 path printing, one previous area (n-1) is checked, and in the case of 3 path printing, two previous areas (n-1 and n-2) are checked.

If the result of the checking indicates that there exist print data, the scanning direction of recording head is carried out to effect the printing operation for the 256 nozzles (step 112).

However, if the result of discrimination indicates that there are no print data, the sheet is fed by one recording width of the recording head, that is, the distance corresponding to 256 nozzles without scanning operation of the recording head. Thus, the sheet is fed with skip of a distance corresponding to 128 nozzles.

In the AUH FIG. 6, the null skip operation is carried out with the minimum unit corresponding to nozzle number Nn divided by path number Np, and therefore, any null skip operation does not resulting disturbance to the corresponding relation between the density correction data and the associated actual printing raster lines. For this reason, the host computer 1 does not simulate the null skip executed by the printer 2.

Referring to FIG. 7, the description will be made as to a specific example. In FIG. 7, the print data exist in region 1, region 4 and region 5, whereas the print data do not exist in region 2 and region 3.

Since the data exist in the region 1, the discrimination add the step 111 is YES when n=1, so that thinned data for the first scan are printed (step 112). For the first area, that is, region 1, the thinned data are printed using lower 128 nozzles of the recording head. Subsequently, the sheet is fed by a distance corresponding to 128 raster lines (step 113), thereafter, the area counter n is incremented by +1 so that n-2.

In the region 2, there are no print data, and therefore, the discrimination at the step 111 is NO. At step 116, the discrimination is made as to whether or not the print data exist in the region (n-1), that is, the region 1. In this case, region 1 contents print data, and therefore, the recording head makes the scanning movement to effect the printing operation for the 256 nozzles (step 112). At this time, since the region 1 contains the data, whereas the region 2 does not contain data, the result is that electrothermal transducer elements only of the upper 128 nozzles are actuated so that only the data remaining after the thinning process are printed. Subsequently, the sheet is fed through a distance corresponding to 128 raster lines (step 113), and the area counter n is incremented by +1 so that n=3.

In the region 3, there are no print data, and therefore, the result of discrimination at step 111 is NO, so that discrimination is made as to whether or not the print data exist in the region (n-1), that is, region 2 at step 116. In this example, there are no print data in the region 2, and therefore, 256 raster line lines corresponding to 256 locals of the recording head are all null, so that scanning operation of the recording head is not carried out, and the sheet is fed through the distance corresponding to 256 nozzles, thus effecting null skip (step 117). Subsequently, the area counter n is incremented by +1 so that n=4.

There are data in a region 4, and therefore, the result of the discrimination is YES, and the recording head is moved for scan to effect the printing operation for the 256 nozzles. Since region 3 does not contain data, whereas the region 4 conditions data, the result is that electro-thermal transducers of only the lower 128 nozzles of the recording head are actuated, so that thinned print data for the region 4 are printed. After the sheet is fed through the distance corresponding to 128 raster lines (step 113), the area counter n is incremented by +1 so that n=5.

The region 5 contains data, and therefore, the result of discrimination is YES, so that scanning operations of the recording head is carried out to effect the printing operation of the 256 nozzles. Since the region 4 and the region 5 contain data, the electro-thermal transducers of the upper and lower 256 nozzles of the recording head are actuated, and the region 4 print data remaining after the thinning process and the region 5 print data remaining after the thinning process are printed. After the sheet is fed through a distance corresponding to 128 raster lines (step 113), the area counter n is incremented by +1 so that n=6.

The region 6 actually does not contain data, and nonexistence of the print data is discriminated at step 111. Therefore, at step 116, the discrimination is made as to whether or not the print data exist in the region (n-1), that is, region 5. Since the region 5 contains print data, the scanning operation of the recording head is carried out to effect the printing operation for the 256 nozzles (step 112). Since region 5 contains data, whereas region 6 does not contain data, the result is that electro-thermal transducers only of the upper 128 nozzles on the recording head are actuated so that only the region 5 print data remaining after the thinning process are printed. Subsequently, the paper feeding is executed for 128 raster lines (step 113), thereafter, the area counter n is incremented by +1 so that n=7.

In this case, when n=7 is discriminated, the end of the process is discriminated at step 115.

As described in conjunction with FIGS. 5 to 7, since the multi-path printing executed by the printer 2 is simulated by the host computer 1, the density correction data s are prepared for the respective combinations of the nozzles to be used for one line printing in the multi-path printing, and the density corrections are carried out using the density correction data s. Therefore, the density correction tables correctly match the actual printing nozzles (combinations of nozzles), and therefore, the unevenness in the destiny and the undesirable stripes can be avoided, thus improving the image quality. The printer 2 detects the null area, in response to which the null skip is carried out so that high speed printing is accomplished.

(Null Skip Process)

Figure 8:
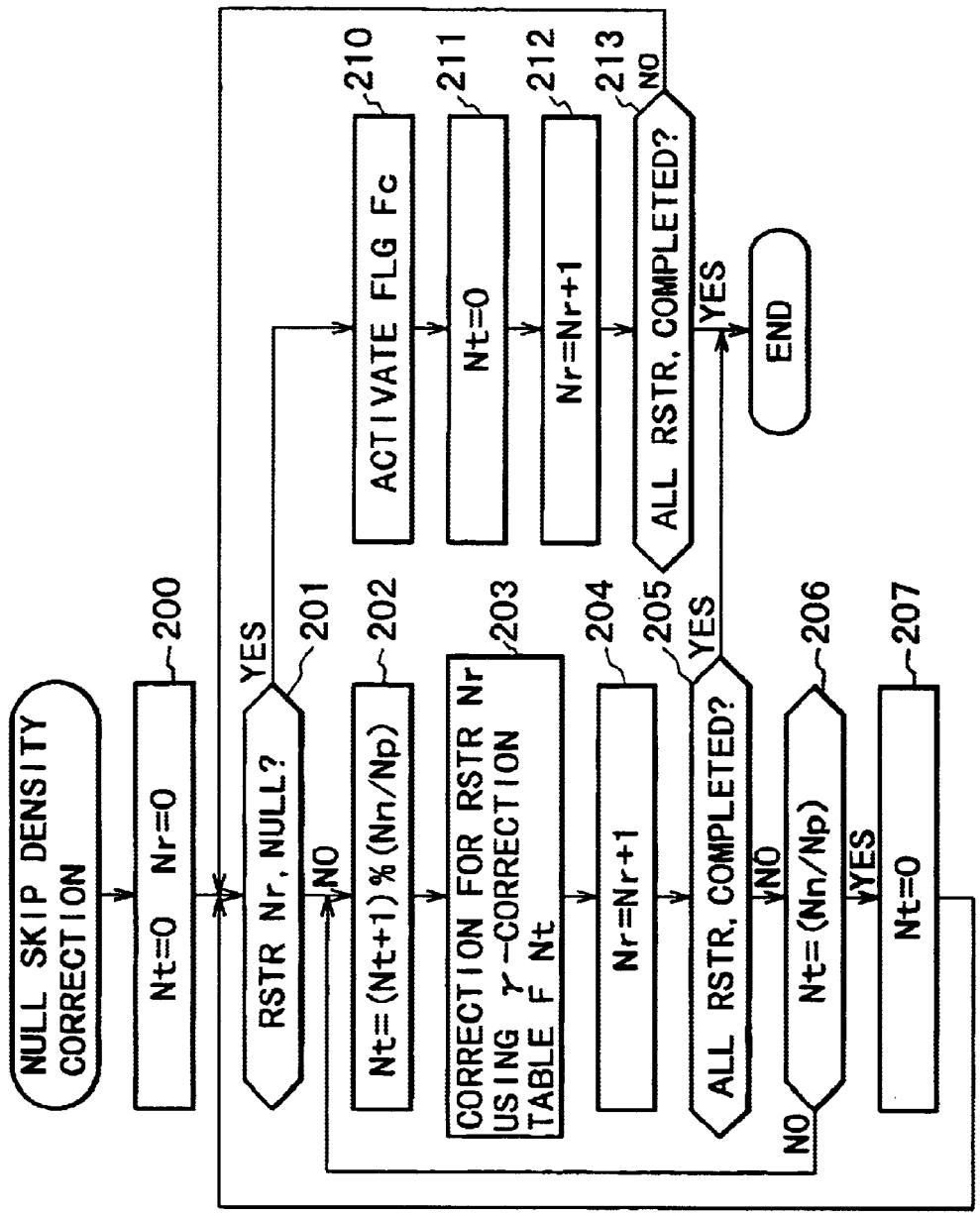
FIG. 8 is a flow chart illustrating a raster density correcting process carried out by the host computer on the basis of simulation of null skip operation.
Figure 9:
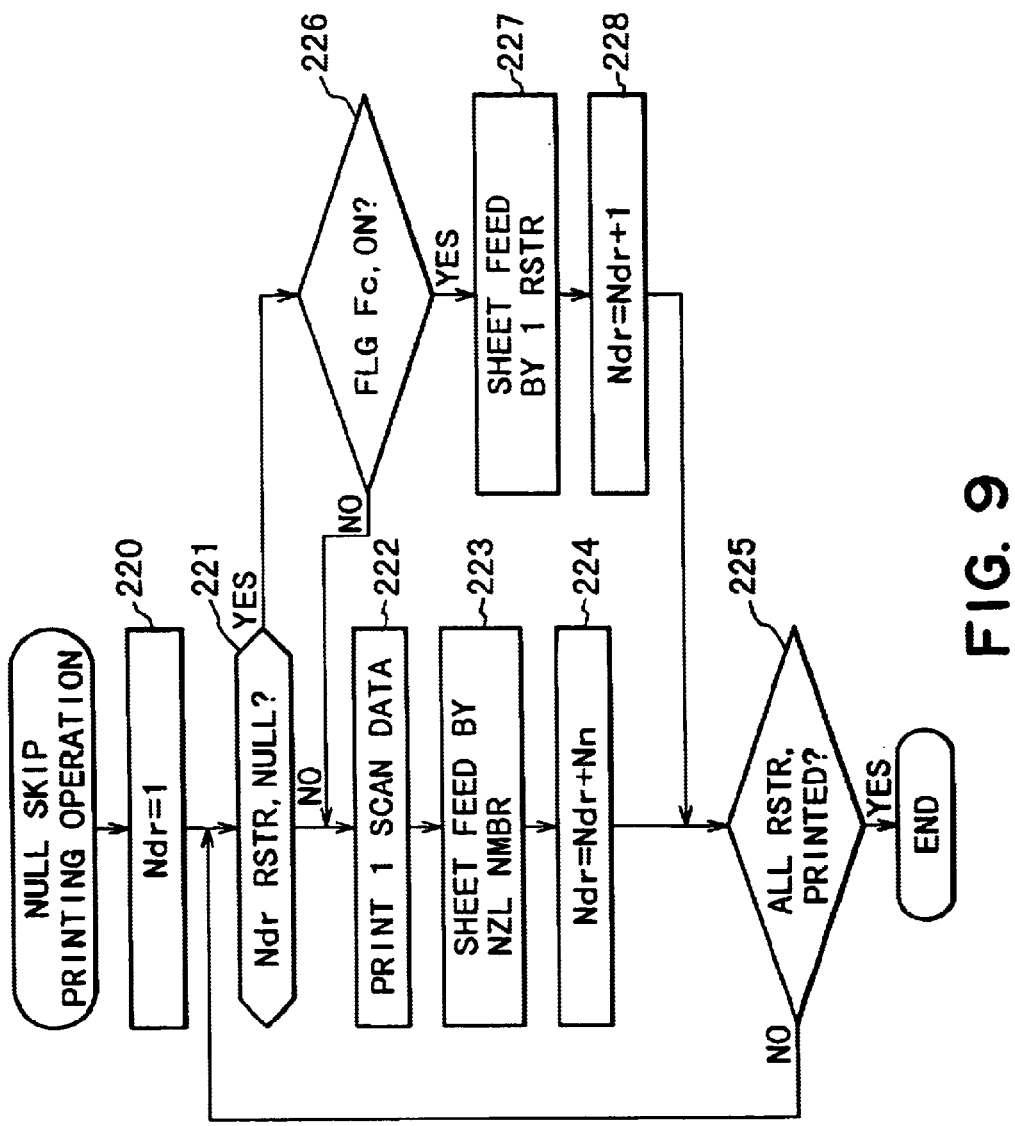
FIG. 9 is a flow chart illustrating a printing process operation executed by a printer which is carried out a null skip operation.
Figure 10:
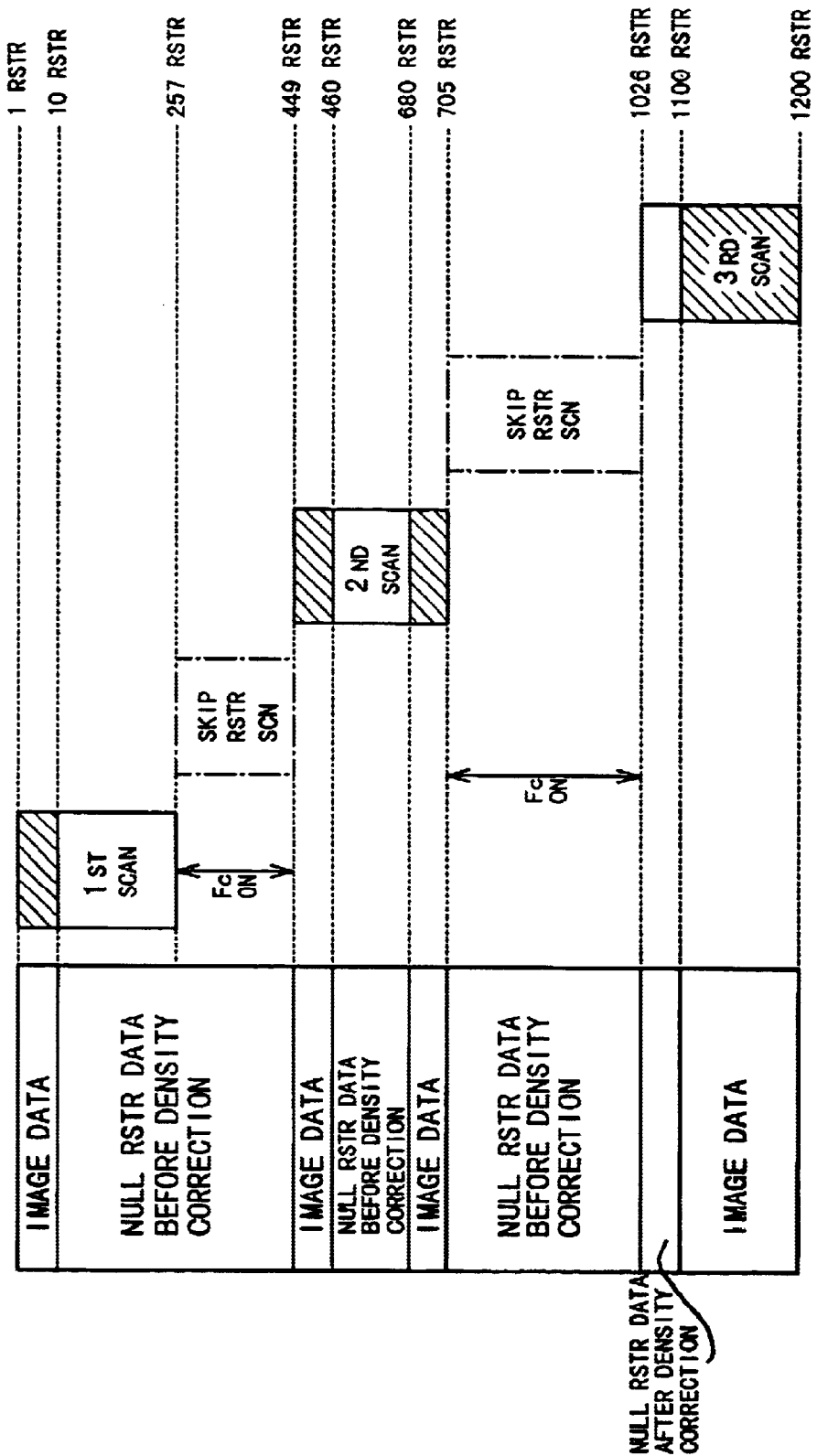
FIG. 10 is a schematic view showing a specific example of null skip process operation.

Referring to FIGS. 8 to 10, the detailed description will be made as to the density correcting process executed by the host computer 1 when the printer 2 carries out the null skip process operation. In this example, similarly the foregoing element, the recording head includes 256 nozzles, and the minimum unit of the null skip operation of the printer 2 is one raster line. In the following description, it is assumed that multi-path printing is not carried out for simplicity of explanation.

Referring first to FIG. 8, the description will be made as to the density correcting process executed by the output γ correction processor 43 (FIG. 4) of the host computer 1 by the simulation of the null skip process executed by the printer 2.

In this case, the 1 path printing is carried out by the 256 nozzles, and correction tables for lower 256 raster lines are set as a one-dimensional LUT for the respected Y, M, C, K colors by the γcorrection table generating/storing portion 46.

First, the table number Nt is reset to 0, and the raster line number Nr of the raster line to be process is reset to 1 (step 200). Subsequently, the discrimination is made as to whether or not the raster line of Nr=1 is null (step 201). The null discrimination is carried out using the multi-level data outputted from the three dimensional LUT42, as described hereinbefore.

If the raster line of Nr=1 is not null (NO at step 201), the table number Nt is incremented by +1 using the similar inflation formula Nt=(Nt+1) % (Nn/Np), (step 202). The above equation is applicable both to the multi-path printing and null skip (general equation). In this case, multi-path printing is not carried out, and therefore, Np=1. At this stage, Nt=1, Nr=1. The raster line data of raster line number Nr=1 is subjected to the output γ correction using the correction table of the table number Nt=1 (step 203).

After the completion of the correcting operation, the raster line number Nr is incremented by +1 (step 204). Subsequently, the discrimination is made as to whether or not the density corrections for all the raster line data corresponding to the first line are completed. At this stage, the result of discrimination at step 205 is NO, and the operation goes to step 206. At step 206, the discrimination is made as to whether or not the output γ correcting operations for the Nn/Np nozzles (in this example, 256) are completed. At this stage, only one density correction is completed yet, the result of discrimination and step 206 is NO, so that operation goes to step 202.

Fed the operations at step 202 is reexecuted, and table number Nt is incremented by +1, and thereafter, the operation of step 203 is executed. Then, the output γ correction is executed for the raster line data of raster line number Nr=2 using the correction table of table number Nt=2.

In this manner, when the discrimination at the step 201 is NO, the loop of operations of steps 202–206 is repeated Nt/Np times (256 times). When the result of discrimination at the step 201 becomes YES, the density corrections are sequentially executed for the 256 raster line lines subsequent to the raster line number Nr.

When the correction for the Nt/Np raster lines are completed (step 206), the table number Nt his set to 0 (step 207) so that operation returns to step 201.

When the result of discrimination at the step 201 indicates that raster line data of raster line number Nr is null (Yes at the step 201), the non-density-correction flag Fc is set to "ON" (step 210). The flag Fc is used when the presence or absence of the null skip is discriminated in the null skip discriminator 48. After the table number Nt is reset to 0 (step 211), the raster line number Nt is incremented by +1 (step 212). Thus, the density correcting process is not executed for the raster line for which the non-density-correction flag Fc is on. This is because there is no need of the correction. The reason why the table number Nt is reset to 0 at the step 211 is that first raster line is printed by the first nozzle in the printing area after the null raster is skipped by the printer 2, and in view of base, the nozzle and the γ correction table are matched with each other.

Then, the discrimination is made as to the density corrections for all of the raster line data are completed or not (step 213), and if so, the process is ended, and if not, the operation returns the step 201.

The processes are executed for all rasters. The non-correction flags Fc are supplied to the printer 2 with the raster line number Nr corresponding thereto.

Referring to FIG. 10, the description will be made as to the process of FIG. 8.

In the case of FIG. 10, the first raster line to the 10th raster, 449th raster to 460th raster, the 680th raster to 705th raster and 1026th raster to 1280th raster contain data other than 0 (non-null) at the stage of the multi-level print data before the density correction, and the other raster lines are discriminated as being null at the step 201 in FIG. 8.

In FIG. 10, the first raster (Nr=1) contains print data, and therefore, the result of discrimination at the step 201 is NO for Nr=1, so that loop of operations of steps 202–206 are repeated 256 times, by which the density corrections are carried out or 256 raster lines from the first raster line (Nr=1) to 256th raster line (Nr=256).

Next, the 257th raster line (Nr=257) to 448th raster line (Nr=448) are null lines, and therefore, the operations of step 210 to step 213 are repeated so that flag Fc is set for the respective lines without executing the output γ correction.

Next, the 449th raster line contains print data, and therefore, the result of discrimination at step 201 for Nr=449 is NO so that loop of operations of steps 202–206 are repeated 256 times, by which the density corrections are executed for 256 raster lines from the 449th raster line (Nr=449) to 705th raster line (Nr=705).

Since the 449th raster line is a line of null skip, and is printed by the first nozzle, and therefore, the density correction for the 449th raster line is carried out on the basis of table number Nt=1.

Next, since the 706th raster line (Nr=706) to 1025th raster line (Nr=1025) are null lines, and therefore, the operations of step 201 to step 213 are repeated, so that flags Fc are added to the raster lines without executive the output γ correction.

Next, the 1026th raster line contains print data (in the multi-level step), and therefore, the result of discrimination and step 201 for Nr=1026 is NO, so that loop of operations of steps 202–206 are repeated 256 times, by which the density corrections are carried out sequentially for the 256 raster lines from the 1026 raster line (Nr=1026) to 1280th raster line (Nr=1280).

Referring back to FIG. 9, the description will be made as to the null skip discrimination process and the null skip printing controlling operation executed by the controller 30 of the printer 2.

The null skip discriminator 50 of the controller 30 discriminates whether or not the null skip is to be carried out for each raster line on the basis of the binary print data supplied from the host computer 1. The null skip discriminator 48 sets the discrimination raster line number Ndr to 1 (step 220) Then, it discriminates whether the raster line Ndr=1 is a null line or not (step 221).

If the result for the discrimination is negative, that is, the raster line is not null, the recording head is moved for scan so that printing operation is carried out for Nn continues nozzles from the raster line. Then, the sheet is fed through a distance corresponding to the Nn nozzles (step 223) and the discrimination raster line number Nr is incremented by the nozzle number Nn (step 224).

On the other hand, it the result of discrimination at the said step 221 is affirmative, that is the raster line Ndr is a null line, the skipping is not effected (usually, it is skipped) for the raster line which becomes a null line as a result of the density correction, in order to maintain the correspondence between the raster lines having been subjected to the density correction and the nozzles. To do this, the non-correction flag Fc from the host computer 1 is referred to, and the ON/OFF of the non-correction flag Fc is discriminated for the raster line (step 226). If the flag Fc is OFF, the operation proceeds to step 222 without effecting the null skip, and similarly to the foregoing, the recording head is moved for scan to execute the printing operation for the Nn continuous raster lines, and the raster line number Ndr is incremented by the nozzle number Nn (steps 222–224)

If, however, the result of discrimination and step 226 indicates that flag Fc is ON, the host computer 1 and the printer 2 simulate the execution of the null skip, and therefore, the one raster skip is executed by simply feeding the sheet by a distance corresponding to one raster line (step 227). Then, the discrimination raster line number Ndr is incremented by +1 (step 228).

Such a process is executed for all raster line.

The description will be made as to the process of FIG. 9 using the specific example of FIG. 10.

In FIG. 10, the first raster line (Ndr=1) contains print data, and therefore, the result of discrimination at the step 221 for Ndr=1 is NO so that operation of step 222 is executed, by which the printing operation is executed for 256 raster lines from the first raster line (Ndr=1) to 256th raster line (Ndr=256). In this case, only the nozzles actually having the print data, namely, the nozzles corresponding to the first to 10th raster lines are actuated so that image data are printed only on the first to 10th raster lines. Then the sheet is fed through a distance corresponding to 256 raster lines.

Then, the 257th raster line (Ndr=257) to 448th raster line (Ndr=448) are null lines and have flags Fc which are ON, so that these raster lines are skipped.

The 449th raster lines contain print data, and therefore, the result of discrimination at step 221 for Ndr=449 is NO, so that process at step 222 is executed, and the recording head is moved for scan (one scan), by which the printing operation is carried out for 256 raster lines from the 449th (Ndr=449) to 705th raster lines (Ndr=705). Here, the image data are formed only for the 449th to 460th raster lines which contain actual print data. After the scan, the sheet is fed by the distance corresponding to 256 raster lines Then, the 706th (Ndr=706) to 1025th (Ndr=1025) raster lines are null lines, and the flag Fc is ON for each of these raster lines, and therefore, raster lines are skipped.

The 1026th to 1100th lines are null lines, but the flag Fc is OFF, and therefore, the result of discrimination is NO, so that process of step 222 is executed, and the recording head is moved for one scan, by which the printing operation is carried out for 256 raster lines from 1026th (Ndr=1026) to 1280th (Ndr=1280) raster lines. After the scanning, the sheet is fed by a distance corresponding to 256 raster lines. Thus, the 1026th to 1100th raster lines are discriminated as having become null by the flag Fc after the density correction, and therefore, the null skip is not executed for these lines.

In this manner, even when the printer 2 executes the null skip action, the density correction can be carried out always with correct correspondence between the actual printing nozzles and the density correction tables prepared for the respective nozzles, since recording operation is simulated by the host computer 1, in this embodiment.

In the case of FIG. 10, the data of 1280 raster lines can be printed by three scans although normally five scans are required.

In the embodiments of FIGS. 5 to 7, the necessity of the execution of the null skip is discriminated at each 128 raster lines (one area), and therefore, even if there is null raster line data comprising less than 128 raster lines, a wasteful scan has to be carried out. In this embodiment, however, the null skip is possible at the unit of one raster line, so that high speed printing operation is possible.

Figure 11:
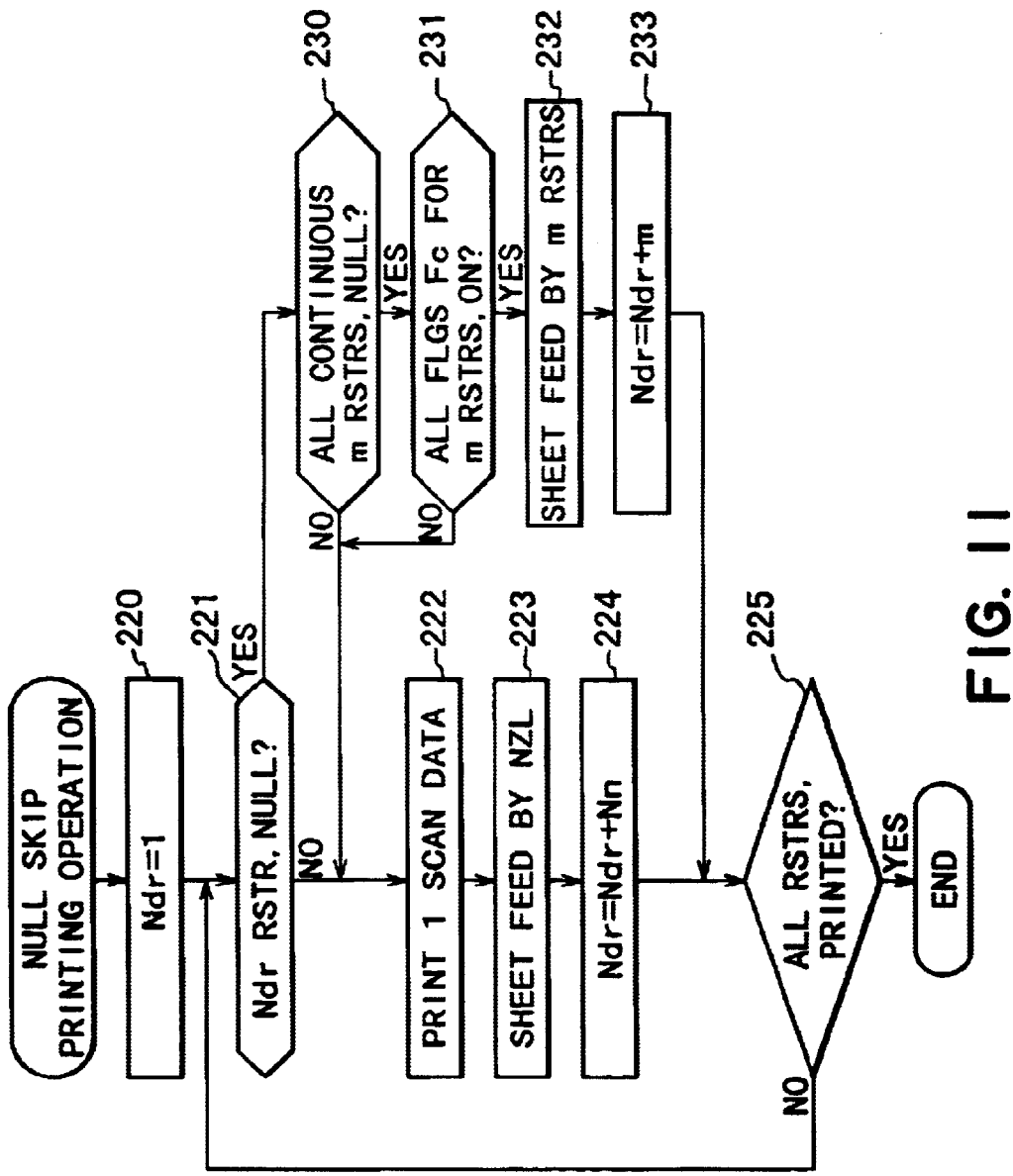
FIG. 11 is a flow chart illustrating a printing process operation when a null skip operation is carried out for each m rasters.

When the minimum raster line number m of the null skip (m≧2, for example, m=8, 16 or the like), the controller 30 of the printer 2 executes the null skip printing process as shown in FIG. 11.

Similarly, by the host computer 1 stimulating recording operation, the proper density correction can be accomplished.

FIG. 11 is a flow chart which is similar to the flow chart of the FIG. 9, but the steps 226–228 of FIG. 9 are replaced with steps 230–233. From the host computer 1, similarly to the foregoing, the non-correction flags Fc are inputted with correspondence to the associated raster lines.

In FIG. 11, when the result of discrimination of the step 221 is YES, the discrimination whether the raster line is null or not is effected for all of the predetermined number (m) of the raster lines from the raster line Nr (step 230), and if the result of the discrimination is that if any one of the continuous raster lines is not null, the process of steps 222–224 is carried out, and the recording head is moved for one scan to carried out the printing operation for the number of continuous raster lines being at the raster line Nr, and then the sheet is fed through the distance corresponding to the nozzle number Nn, and thereafter, the discriminating raster line number Ndr is incremented by the nozzle number Nn.

However, when all of the predetermined number of the continuous raster lines beginning at raster line Nr are null, the discrimination is made as to whether or not the non-correction flags Fc are all ON, for the m raster lines (step 231). If any one of them is OFF, the process of steps 222–224 is executed similarly to the foregoing.

If all of the m flags are ON, the operation is only to feed the sheet through the distance corresponding to m raster lines, thus skipping the m raster lines. Subsequently, the discrimination raster line number Ndr is incremented by + m (step 233)

When the null skip at the unit of one raster line or m raster lines is carried out with multi-path printing, the host computer 1, as shown in FIG. 8, effects the density correction at the unit of Nn/Np, and the non-correction flags Fc are outputted with correspondence to the raster line numbers, and the printer refers to the non-correction flags Fc to effect the null skip discrimination.

In the foregoing embodiment, the non-correction flag Fc supplied from the host computer 1 is referred to, and the controller 30 of printer 2 makes the final discrimination as to whether or not the null skip is to be carried out or not. As an alternative, the output of the binarization processor 45 is fed back to the γ correction processor 43, and the lines subsequent to the raster line having became null by the binarization may be skipped, and the γ correction process may be reexecuted. In this case, the null skip operation of the printer 2 can be completely simulated, and therefore, there is no need of supplying the control information such as non-correction flag Fc to the printer 2. To Embodiment 2

In this embodiment, black and color recording heads 24Y, 24M, 24C, 24K have the same number of recording elements. The host computer 1 simulates the recording operation of the printer 2, and on the basis of the information, the image processing is carried out for the image data of each raster line, and then the image recording is carried out.

Figure 12:
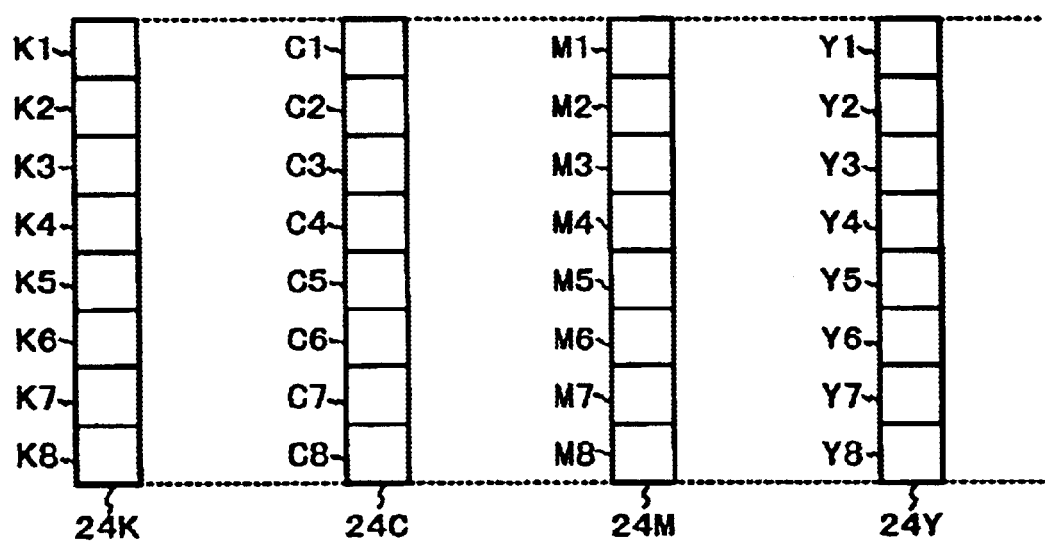
FIG. 12 is a schematic view showing an example of a recording head.

Here, as shown in FIG. 12, the use is made with recording heads 24Y, 24M, 24C, 24K for black, cyan, magenta and yellow colors. The recording heads have the same number of recording elements, and can effect printing in accordance with image data, independently from each other. In this embodiment, the number of the recording elements is 8, and they can effect the recording of the image data simultaneously with the same width. Here, the width of the recording element, that is, the image recorded by the image data of 8 raster lines, is defined as "one line".

The recording operation of the printer 2 in this embodiment is as follows. When only the black image data are to be printed, the image is finished through one scan, and therefore, the recording is carried out using all of the recording elements K1–K8 of the black recording head. On the other hand, the image data include color image data, the image is finished through a plurality of scanning and recordings. Here, the image is finished through two scans for each color. To accomplish this, the top raster lines of the color image data are assigned to the recording elements (K1, K5), (C1, C5), (M1, M5) and (Y1, Y5). In this case, the distance or amount of the sub-scan of the printer 2 is made ½, by which two recording elements are assigned to one raster line. Thus, in this embodiment, the printer 2 sets the printing mode (the number of scanning and recording, the amount of the scanning movement in the sub-scan direction) in accordance with the image data.

The description will be made as to the simulation of the recording operation of the printer 2 and the image processing of the image data, executed by the host computer 1.

First, in the case of the image data containing only that black image data, the printer 2 effects the printing operation using all of the recording elements K1–K8 of the black recording head, and therefore, the host computer 1 simulates those operations. For the image data, the recording element K1 is assigned to the first raster line, and the image processing is executed to the recording element. Here, the image processing means the above-described density correcting process and the quatitization process. The event that image processing is carried out for the recording element K1 is stored in the raster line. Therefore, the image data having been subjected to the image processing comprises the quantitized print data and the recording element information.

To the next raster line, the recording element K2 is assigned, and the proper image processing is imparted to the recording element, the information to the effect is stored in the raster line. To the next raster line, the recording element K3 is assigned, and similarly, the proper image processing is executed for the recording element, and the recording element information is stored in the raster line. The image processing is carried out for each raster line up to the recording element K8 in response to the recording element. By doing so, the image processing is completed for all image elements, namely, for 8 raster lines, that is, for one line. To the next raster line, the recording element K1 is assigned, and the proper image processing is effected to the recording element.

In this manner, the image processing is separably carried out for the recording element for each raster line at a cyclic period of the number of the recording elements, and the recording element information is stored.

When the data include also the color image data, the printer 2 finishes the image through two scans, and therefore, the host computer 1 simulates those operations.

More particularly, in the printer 2, the recording element edges (K1, K5), (C1, G5), (M1, M5) and (Y1, Y5) are assigned to the first raster lines having the color image data, and the host computer 1 simulates the process for this.

In the host computer 1, the recording elements (K1, K5), (C1, C5), (M1, M5) and (Y1, Y5) are assigned to the first raster lines having the color image data, and the image processing is effected for each recording element for each color, and the recording element information is stored on the respective raster lines. Here, when one raster line is recorded by a plurality of recording elements, the use is made with an average of correction values for two recording elements on the basis of discrimination from the density correction data.

As an alternative, a larger one, rather than the average, of the correction values for the two recording elements.

To the next raster line, the recording elements (K2, K6), (C2, C6), (M2, M6) and (Y2, Y6) are assigned, and the proper image processing is effected for each recording element and for each color, and the recording element information is stored on the raster line. In this manner, the image processing is carried out in response to the recording element for each raster line up to the recording elements (K4, K8), (C4, C8), (M4, M8) and (Y4, Y8). This is one cyclic period of process, and the image processing operations are carried out in response to the respective recording elements for each raster line at the cyclic period, and the recording element information is stored. In this manner, the image processing is executed for each raster line in accordance with the printing mode.

Thus, the host computer 1 simulates the recording operation to be carried out by the printer 2 in accordance with the image data, and therefore, even if the assignment of the recording element to be used for the recording of the raster line in accordance with the image data by the printer 2 is changed, the image processing can be carried out correspondingly to the right recording element.

The recording element information is stored for each raster line, and the information is supplied for the host computer 1 to the printer 2, and therefore, the printer control the recording operation on the basis of the recording element information, so that processing load can be reduced. In addition to the recording element the printing mode information such as information, the scanning and recording number of, the amount of the movement of the sub-scan may be provided, by which the printer can control the recording operation with the reduced processing load.

Here, the image data may include both of portions of black-only and portions of color (chromatic) in a mixed manner. In such a case, when the image recording is carried out at the constant cyclic period as described above, an inappropriate sub-scan and/or lowering of the efficiency occurs when the data include null data or at a boundary portion between the image of black-only and the image containing color image, with the result of reduction of the throughput. In the printer 2 of this embodiment, the consideration is paid to the case of mixed black-only portion and color containing portion. The recording mode is selected not on the basis of the image data for one raster line but on the basis of a plurality of raster lines.

More particularly, before the recording elements are assigned to the raster lines, the use is made with the image data buffer which temporarily stores the image data for more than one line, and if the data indicate that image is a black-only image, then image processing for one line is continued, and if the data indicate a mixture of the color image, the priority is given to the raster line containing the color data so that operation is matched to the cyclic period of the color. Together with this, the host computer 1 simulate the recording operation of the printer 2 to enable the image processing in accordance with the recording element assigned to the raster line recording.

Figures 13A, 13B:
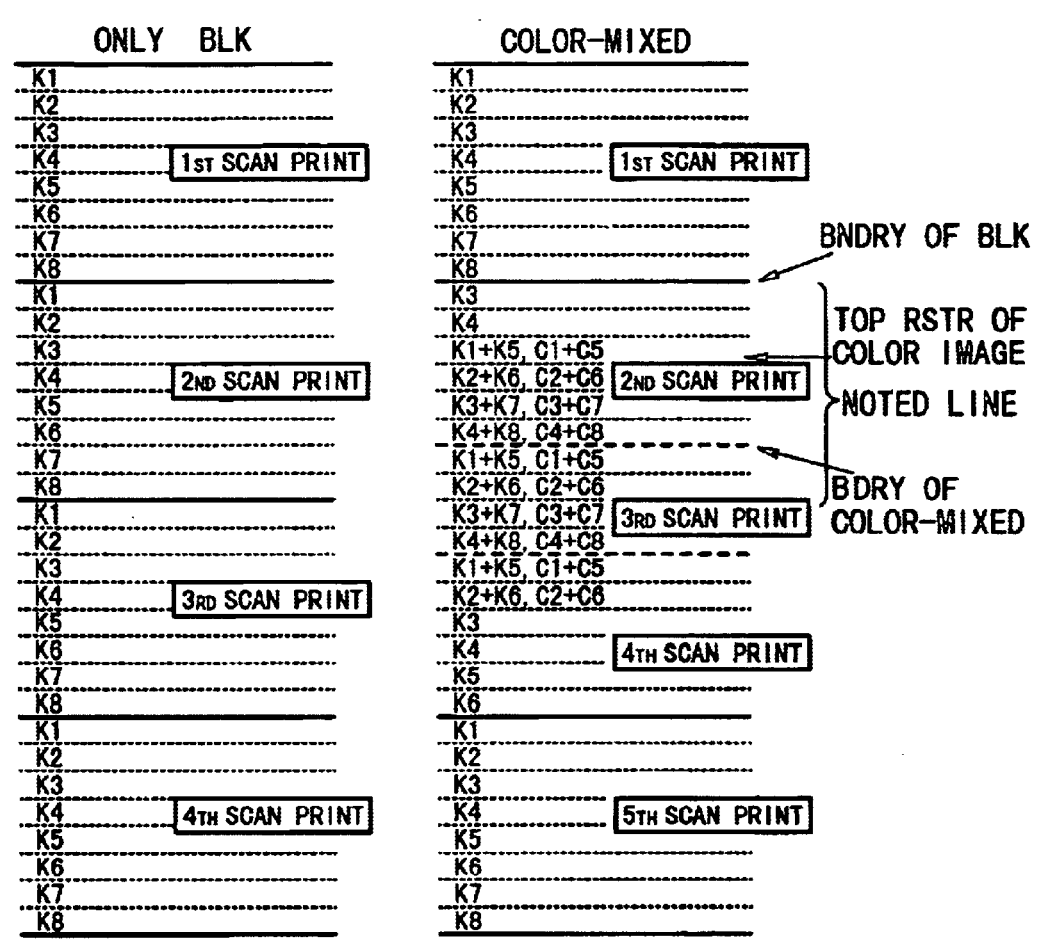

FIG. 13 shows an example of simulation in which black-only image data in one line and an example of simulation in which black-only data and the color data are mixed in one line. FIG. 13A shows the case of the black-only image data, wherein the K1–K8 recording elements are assigned to each raster line at a constant cyclic period for each line, and the image processing is effected.

FIG. 13B shows the example of the color containing image data, wherein when no color exists in the line, that is, the data are black-only image data, the K1–K8 recording elements are assigned to each raster line at a constant cyclic period for each line, and the image processing is effected, similarly to the case of FIG. 13A. On the other hand, the color exists in the line, the raster line of the image data containing color is assigned to the first raster line of the color data, and the image processings are effected for the corresponding recording elements for each raster line.

Here, the recording element K3 is assigned to the first raster line of the noted line, and the range which can be covered by one scan is 6 raster line (K3–K8).

In this manner, in this embodiment, the printer 2 carries our forward reading using the buffer for temporarily retained the image data for one line, and therefore, the image is finished by 5 scans. Similarly, the host computer 1 simulates this to effect the image processing.

Figure 14:
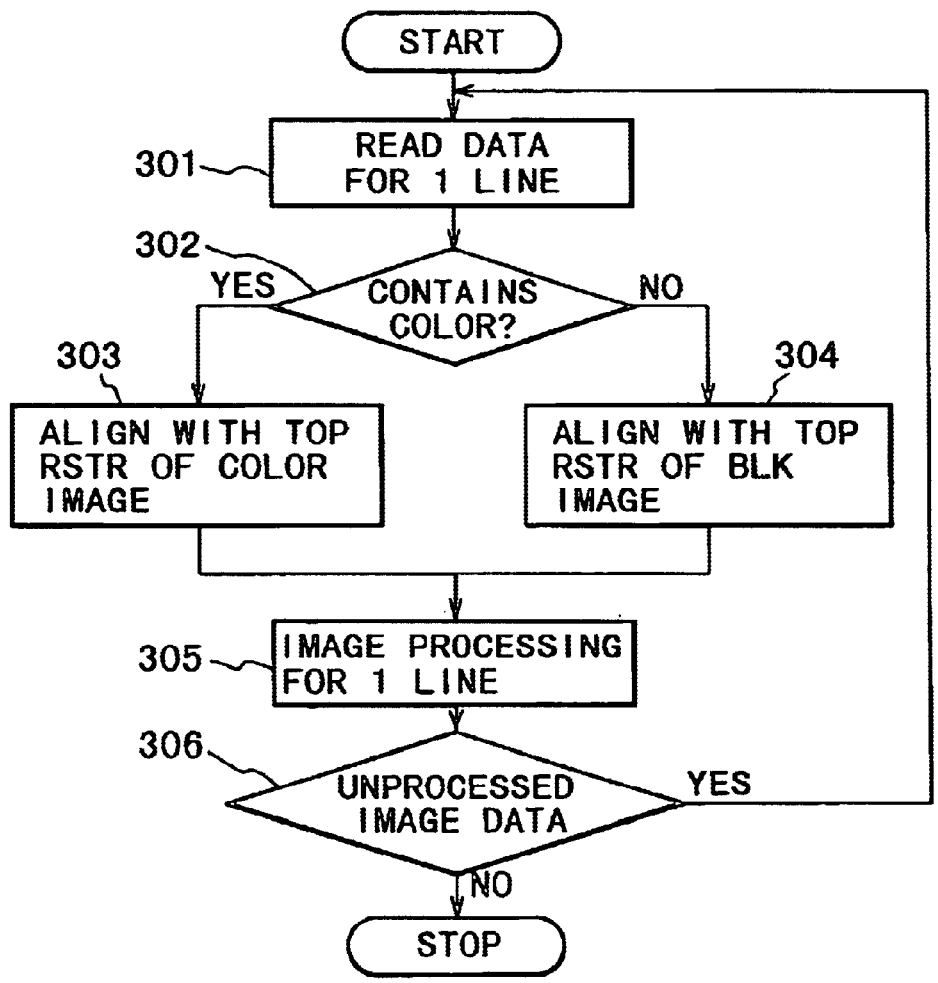
FIG. 14 is a flow chart showing an algorithm in the host computer when recording elements are assigned to the raster lines for which simulation is effected for the image data containing a mixture of a black line and a black-color line.

FIG. 14 shows an example of a flow chart of an algorithm simulating the recording operation of the printer 2 to assign the recording elements to the respective raster lines and effect the image processing in the host computer 1, in this embodiment.

First, at step 301, the image data are read in an image data buffer for temporarily retaining the data for one line. At step 302, the discrimination is made as to whether or not the read image data contain color image data. If so, the recording element is assigned with the cyclic period of the recording element matched with the first raster line of the color image data at step 303. If not, that is, if the data are only black image data, the recording element is assigned with the cyclic period of the recording elements matched with the first raster line of the black image data at step 304. At step 305, the image processings are effected for respective raster lines correspondingly to the assigned recording elements. Finally, the discrimination is made as to whether or not there is any image data not processed, and if so, the operation returns to step 301. If not, the algorithm ends.

As described above, the operation of the printer 2 executing the recording operation is simulated with the recording elements assigned to the respective raster lines in accordance with the image data, and therefore, the recording elements used can be determined for the respective raster lines by the host computer 1, so that image processings are possible for the respective recording elements to be used. Accordingly, the printer 2 can provide high quality images.

Embodiment 3

In this embodiment, the recording operation of a printer 2 using a recording head having different numbers of recording elements for black color and chromatic color, is simulated, and on the basis of the information, the image processing is effected for each raster line of the image data on the basis of the information of the simulation, and then, the image recording is effected. The description will be made as to the case in which the number of the recording elements for the black color is larger than that for the color in order to provide high speed recording for the black letters.

Figure 15:
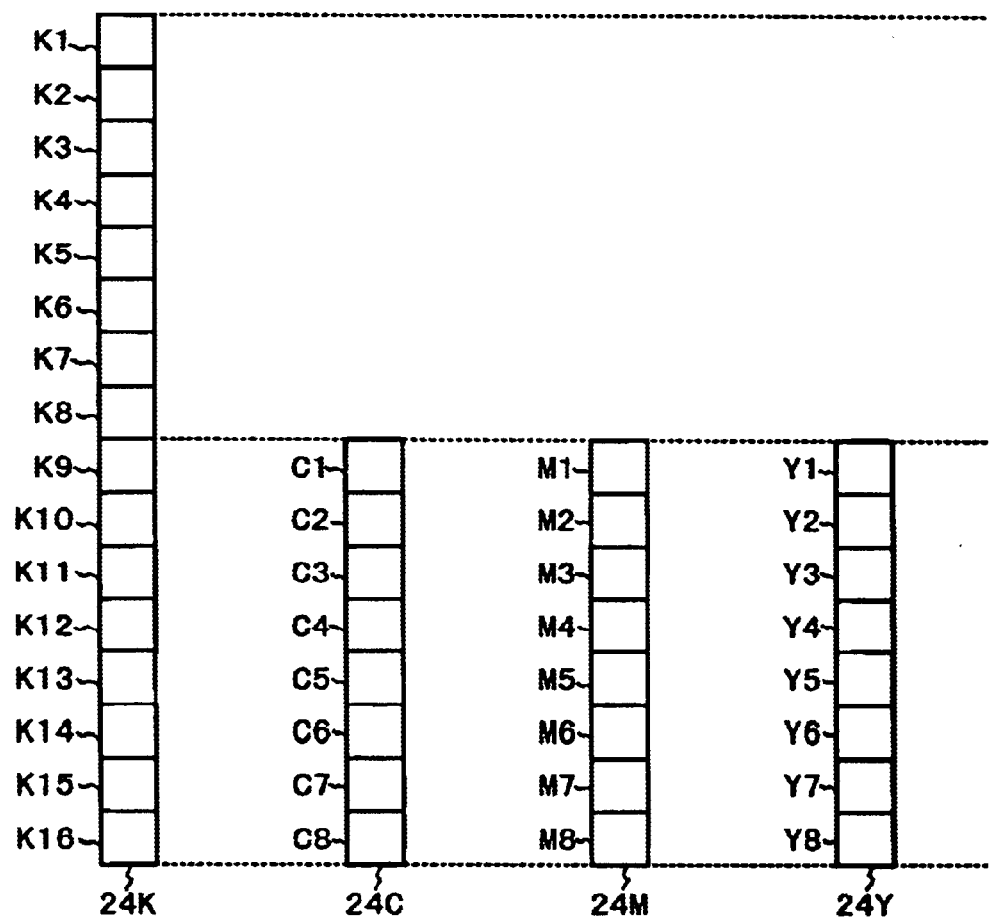
FIG. 15 is a schematic view showing another example of a recording head.

As shown in FIG. 15, recording heads 24Y, 24M, 24C, 24K for the black, cyan, magenta and yellow colors. The black recording head and the cyan, magenta and yellow recording heads have different numbers of the recording elements and are independently operable in accordance with the image data. For the sake of simplicity of explanation, the number of the black recording elements is 16, and the numbers of the cyan, magenta and yellow recording elements are 8, respectively. In response to the image data to be recorded, the width of the image data to be recorded can be set, and the recording is effected on the basis of the setting. In the case of the black-only image data, the maximum width of the recording by one scan corresponds to 16 raster lines, in the case of the color image data, it is 8 raster line. The width of the total recording elements, that is, the image recording by one recording scan, is defined here as one line.

The recording operation of the printer 2 in this embodiment is as follows. First, in the case of the black-only image data, the one recording scan covers the width which is equal to the width of the total recording elements of the black recording head, and in the case that data include color image data as a mixture, it is the width of the total color recording elements. The recording width may be different depending on the image data, and the amount of the sub-scan is set in accordance with the number of t recording elements.

The process by the host computer 1, including the simulation and the image processing will be described.

For the black-only image data, the recording is effected using all of the recording heads K1–K16, and the first raster line of the image data is assigned to the recording element K1, and the proper image processing is effected to the recording element. Here, the image processing means the density correcting process and the quatitization process. The event that image processing has been effected to the recording element K1 for the raster line, is stored on the raster line. Therefore, the image data having been subjected to the image processing comprises the quantitized print data and recording element information. For the next raster line, the recording element K2 is assigned, and the proper image processing is effected for the recording element, and the recording element information is stored on the raster line; for the subsequent raster line, to the recording element K3 is assigned, and the proper image processing is effected, and the recording element information is stored on the raster line. In this manner, the image processings are carried out for the recording elements for each raster line up to the recording element K16. Then, the image processings for the all image elements (for 16 raster lines), that is, for one line.

For the next raster line, the recording element K1 is assigned again, and the proper image processing is effected for the recording element. In this manner, the image processing is sequential effected for the recording elements for each raster line at the cyclic period which corresponds to the number of the recording elements, and the recording element information is stored. These processes are repeated.

When the color image data are mixed, the image recording is carried out with the width of the color recording element. For the color image data, the first raster line is assigned to the recording elements K9, C1, M1, Y1, and the proper image processing is effected for each of the recording elements and for each color, and the recording element information is stored on the raster line. For the next raster line, the recording elements K10, C2, M2, Y2 are assigned, and the proper image processings are effected for each recording element and for each color, and the recording element information is stored in the raster line.

In this manner, the image processings for the recording elements are effected for raster line up to the recording elements K16, C8, M8, Y8. This is one cyclic period, and the image processings are sequentially carried out for the respective raster lines, and the recording element information is stored, at the interval of the cyclic period. Thus, the image processings are effected for the respective raster lines in accordance with the amount of the sub-scan.

The simulation for the recording operation modified by the printer 2 is carried out in accordance with image data, by which the host computer 1 can establish the correspondence between the recording elements actually used by the printer 2 and the raster lines. Thus, it is possible to effect the image processings for the recording elements used by the printer 2, for each raster line.

By sending the recording element information to the printer 2 from the host computer 1, for each raster line, the printer 2 can control the recording operation on the basis of the recording element information, so that processing load can be saved.

Here, some image data may contain mixed black-only data and color data. Therefore, similarly to the foregoing embodiments, the printer 2 of this embodiment sets the recording mode from the image data of a plurality of raster lines.

FIG. 16 shows examples of simulations in one of which one line contains only black image data and in the other of which the data contains black-only data and color data in a mixed manner. FIG. 16A deals with the case of black-only image data, wherein the recording elements K1–K16 are assigned to the respective raster lines, line by line, at regular intervals (cyclic periods), and the image processings are carried out, respectively.

On the other hand, in the case of FIG. 16B showing the color containing image data, when there is known color data in the line, that is, the data are black-only, the recording elements K1–K16 are assigned to the respective raster lines at constant intervals for the respective lines, similarly to the case of FIG. 16A, and the image processings carried out. On the other hand, when the line contains color data, the raster line of the image data is taken as a first raster line for the color data, and the image processing is carried out for the recording element corresponding to the raster line, for each raster line.

In the noted line, the cup of the contained color image data is taken as a first raster line of the color data, and the recording elements K9, C1, M1, Y1 are assigned thereto. Therefore, the recording element K7 is assigned to the first raster line of the noted line, so that range covered by one scan for the noted line is 10 raster lines by the K7–K16.

In this manner, in this embodiment, the printer 2 carries out forward reading with the use of a buffer for temporarily stores the image data of one line, and the image is completed by 5 scans. The host computer 1 simulates this to effect that image processing.

In the case that printer 2 does not have an image data buffer for temporarily storing the one or more lines of image data, the recording element K1 is unconditionally assigned to the first raster line of t noted line. What can be recorded by one scan is dependent on the color containing image data, and therefore, in the case of FIG. 16B, the recording elements K1–K2 are assigned to the first raster line and the next raster line of the noted line. In this case, it is necessary to effect the recording scans separately for the black-only image data and for the color containing image data because of the difference in the numbers of t recording elements in the black and t color. When such a printer 2 is connected with t printer 2, the host computer 1 can simulate the recording operation of the printer 2 if the presence or absence of the image data buffer in the printer 2 is known.

The algorithm for simulating the recording operation of the printer 2 in order to assign the recording elements to the respective raster lines in this embodiment is the same as shown in FIG. 14.

As described in the foregoing, in this embodiment, the use is made with a recording head having different numbers of recording elements for the respective colors, and the recording operation of the printer setting the amount of the sub-scan for each recording scan in accordance with the image data, is simulated, so that image processing can be executed correspondingly to the recording element used for the recording of the raster lines by the printer.

The description will be made as to a modified example of this embodiment, wherein the recording elements are similar, and wherein the black recording and the color recording are sequentially carried out without simultaneous recording of the black recording element and the color recording element on the same raster lines in view of the image defect such as boundary spread between the black area and the color area.

For the black-only image data, all of the recording elements K1–K16 of t black recording head, and therefore, similar image processing is carried out. When the image data contains color date, the image recording is carried out with a width of the color recording element. For the color image data, the recording elements K9, C1, M1, Y1 are assigned to the first raster line, and the appropriate image processing is affected for each recording element, and the recording element information is stored in the raster line. The recording elements K10, C2, M2, Y2 are assigned to the next raster line, and appropriate image processing is effected to each of the recording element, and the recording element information is stored in the raster line. In this manner, the image processings are effected in accordance with the recording elements, for each raster line up to recording elements K16, C8, M8, Y8. This is one cyclic period. With the same cyclic period, the image processing is repeated in accordance with the recording element for each raster line sequentially, and the recording element information is stored.

Thus, the image processings are effected for the respective raster lines in accordance with the amount of t sub-scan.

Thus, in the recording method wherein the black recording and t color recording are sequentially effected, the recording operation of the printer is simulated, by which the image processing is accomplished with correct correspondence between the raster lines and the recording elements.

Embodiment 4

The description will be made as to an example wherein a printer 2 having a recording head in which the number of the recording elements for the black and the number of t recording elements for the color are different, is used, and the recording operation of the printer 2 is simulated, and then the image processing is effected for each raster line of t image data on the basis of the information provided by the simulation. The description will be made as to the case wherein the number of the black recording elements is larger in order to accomplish high speed recording for black letters. The description will be made as to the case in which the printer 2 is not provided with an image data buffer for temporarily storing one or more lines of image data.

Figure 17:
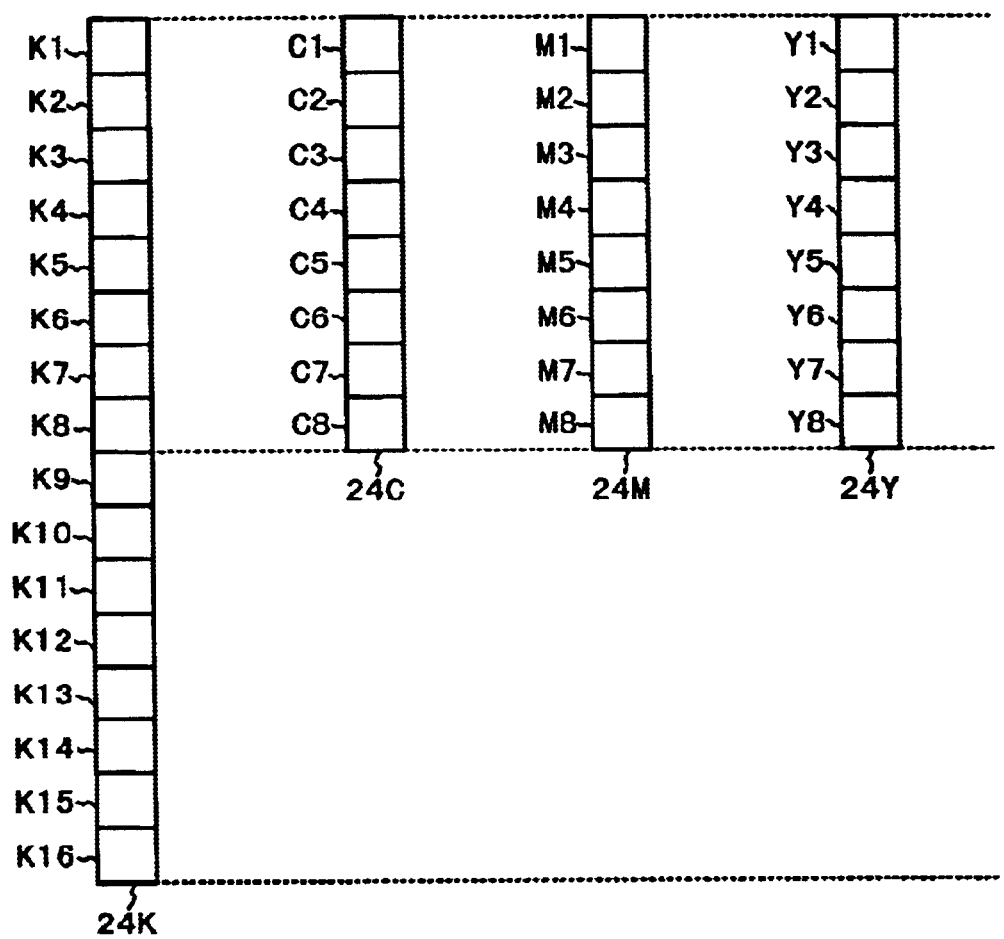
FIG. 17 is a schematic view showing another example of a recording head.

FIG. 17 shows an example of a structure of the recording head provided in the printer 2 of this embodiment. This is different from the FIG. 15 in the arrangement in the sub-scan direction of the black recording head and the cyan, magenta and yellow recording heads.

The recording operation of the printer 2 of this embodiment is as follows. When the image data are only black data, the recording width of one recording scan is the width of the recording elements of t black recording head, and when the image data contains color data, the recording width is the width of the color recording elements. This is the case in which the recording width is different depending on the image data, and the amount of t sub-scan is set in accordance with the number of the recording element.

The description will be made as to the process of t host computer 1 which simulates the recording operation of the printer 2 and effect the image processing. For the black-only image data, similarly to the previous embodiment, the recording is carried out using all of the recording elements K1–Kl6 of t black recording head, and therefore, the recording element K1 is assigned to the first raster line of the image data, and appropriate image processing is effected for the recording elements.

When the image data contains color date, the image recording is carried out with the width of the color recording elements. For the color image data, the recording elements K1, C1, M1, Y1 are assigned to the first raster line, and the appropriate image processing is effected for each of the recording elements and for each color, and the recording element information is stored in the raster line. To the next raster line, the recording elements K2, C2, M2, Y2 are assigned, and the appropriate image processing is effected for each recording element and for each color, and the recording element information is stored on the raster line. In this manner, the image processing in accordance with the recording element is effected for each raster line up to the recording elements K8, C8, M8, Y8. This is one cyclic period. With the same cyclic period, the image processing is repeated in accordance with the recording element for each raster line sequentially, and the recording element information is stored. Thus, the image processings are effected for the respective raster lines in accordance with the amount of t sub-scan.

Here, some image data contain both of the black-only portions and color portions in a mixed manner. Therefore, similarly to the above-described embodiment, the cyclic period of the image processings is not constant, but is changed in accordance with the image data.

Figures 18A, 18B:
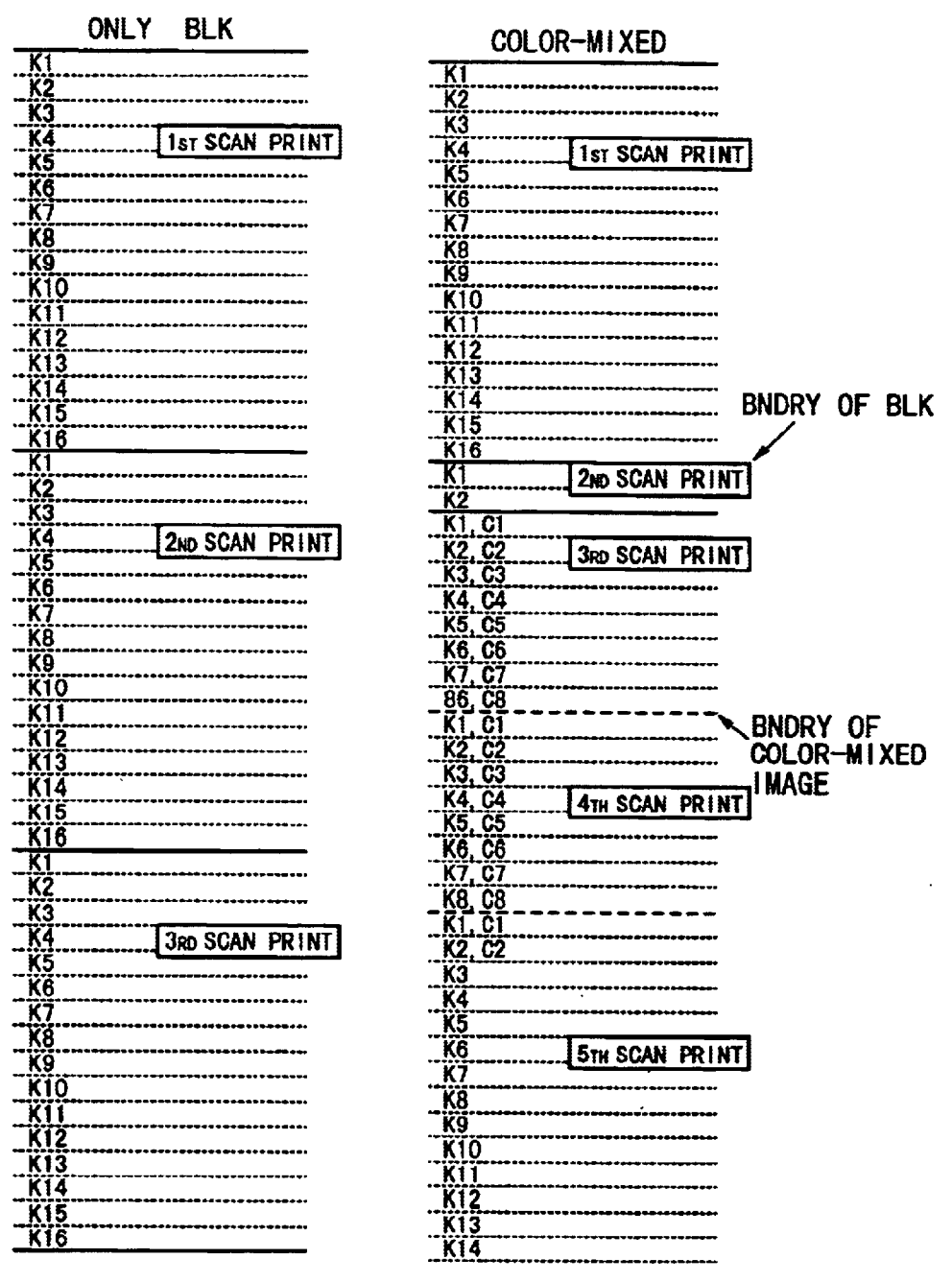

FIG. 18 shown an example of a simulation in the case that one line contains only black image data and the case that one line contains mixed black-only data and color data. FIG. 18A deals with the case of the black-only image data wherein the recording elements K1–K16 are assigned to each raster line at a constant cyclic period, for each line, and the image processing is carried out.

In FIG. 19, which deals with the color containing image data, when no color exists in the line, that is, only black, the recording elements K1–K16 are assigned to each raster line at a constant cyclic period, for each line, and the image processing is carried out, similarly to FIG. 18A. On the other hand, when color data exist in the image data of the line, the raster line is taken as first raster lines for the black and color data even if the back and color data are mixed, and the image processing is effected in accordance with the recording element corresponding to each raster line. Although there is a difference between the black and t color in the number of the recording elements. The recording head is such that it always aligns the first raster lines of the black recording and color recording. Therefore, even if the printer 2 is not provided with an image data buffer for temporarily storing one or more image data, the amount of the sub-scan can be changed for the respective recording scans.

In addition, the simulation of the recording operation of the printer 2 by the host computer 1 enables the image processing in accordance with the recording elements.

As described in the foregoing, in this embodiment, the printer 2 in which the recording operation is changed in accordance with the image data is simulated, the image processing is possible with the recording elements assigned to the raster line.

Embodiment 5

The description will be made as to the example in which the present invention is applied to the density supplementation and failed-ejection supplementation when the recording is not proper due to the defect in the recording element or recording elements. The density correction and the failed-ejection supplementation means the process in which when some recording element or recording elements of all of the recording elements to be used are unable to provide a necessary pixel density because of insufficient amount of the ink ejection, ejection failure or the like, the other recording element or recording elements of them compensate for the insufficiency of the density, thus avoiding deterioration of the image quality.

This is possible when the multi-path recording using different recording elements is employed. In the case of a simple constant cyclic recording operations, the combination of the recording elements corresponding to the raster line is constant, but when the printing mode of t printer 2 is switched in accordance with the image data, the combination of t recording element correspondence sing to the raster line changes. By the host computer 1 simulating the recording operation of the printer 2, the image processing is possible for each recording element and for each raster line.

FIG. 19 shows an example of the recording operation in which the number of the recording scans is different. The description will be made as to the case wherein the amount of the ink ejection of the recording element N12 is so insufficient to provide a necessary pixel density, and the other recording element is desirably used for compensation to provide satisfactory recorded pixel.

Figure 19A:
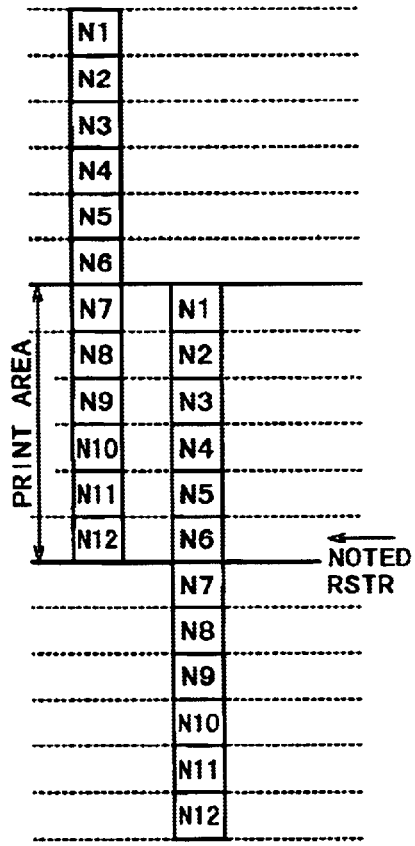
FIG. 19 is an illustration of a recording operations in a 2 path printing and 3 path printing.

In the 2 path recording shown in FIG. 19A, the image recording for a recording region is finished by two recording scans. Here, the noted raster line is recorded by the recording elements N6, N12. It is assumed here that density of the pixel printed by the recording element N12 is only 50% approx of the density provided by the normal recording element, then the resultant image density of the noted raster line is approx 75%, since the provided density is an average of the densities provided by the recording element N12 and the normal recording element (0.5+1.0)/2). For the density supplementation, it is desired that density is raised up to approx 133% for the noted raster line (1.0/0.75) by correction.

Figure 19B:
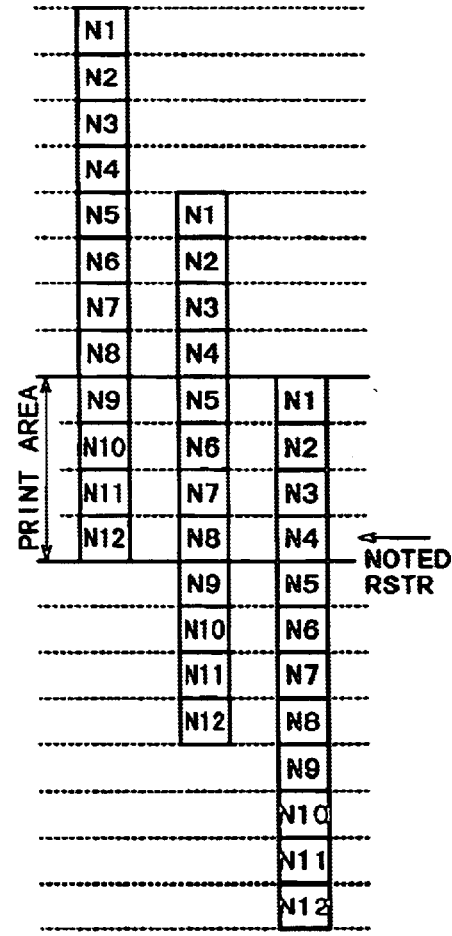

On the other hand, in the case of 3 path recording shown in FIG. 19B, an image recording for a recording region is finished by three recording scans. Here, the noted raster line is printed by the recording elements N4, N8, N12. When the density of the pixel printed by the recording element N12 is approx 50% of the normal density, the image density of t noted raster line is the average of those provided by the recording elements N4, N8 and N12, that is, approx 83% (=(0.5+1.0+1.0)/3). So, for the density supplementation, it is desired to raise the density by approx 120% by correction.

Thus, even if the same recording heads are used, the correction value for the density in t image processing is different if the printing mode is different. In view of this, in this embodiment, the recording operation is simulated in accordance with the printing mode in which the recording device is operated, and the image processing is effected for each raster line.

The 2 path and the 3 path printing mode are selected in accordance with the image quality, more particularly, whether the image data are those of a letter or an image and the material of the recording sheet such as the fixing property of the recording sheet. The larger number of the paths provides a high reducing effect of the density non-uniformity, and a higher fixing property, since the amount of the ink shot in a unit area is smaller.

There is a case in which the recording is not complete due to the defect of the recording element, in other words, there is a recording element which does not eject the ink. This means that density of t pixel printed by the recording element is zero, that is, the density is 0%. In this case, the density of t recorded pixel for the recording element is supplemented to the maximum. For example, in the 2 path recording shown in FIG. 19A, the correction of 200% increase is desired, and in the 3 path recording of FIG. 19B, 150% increase is desired.

Figure 20:
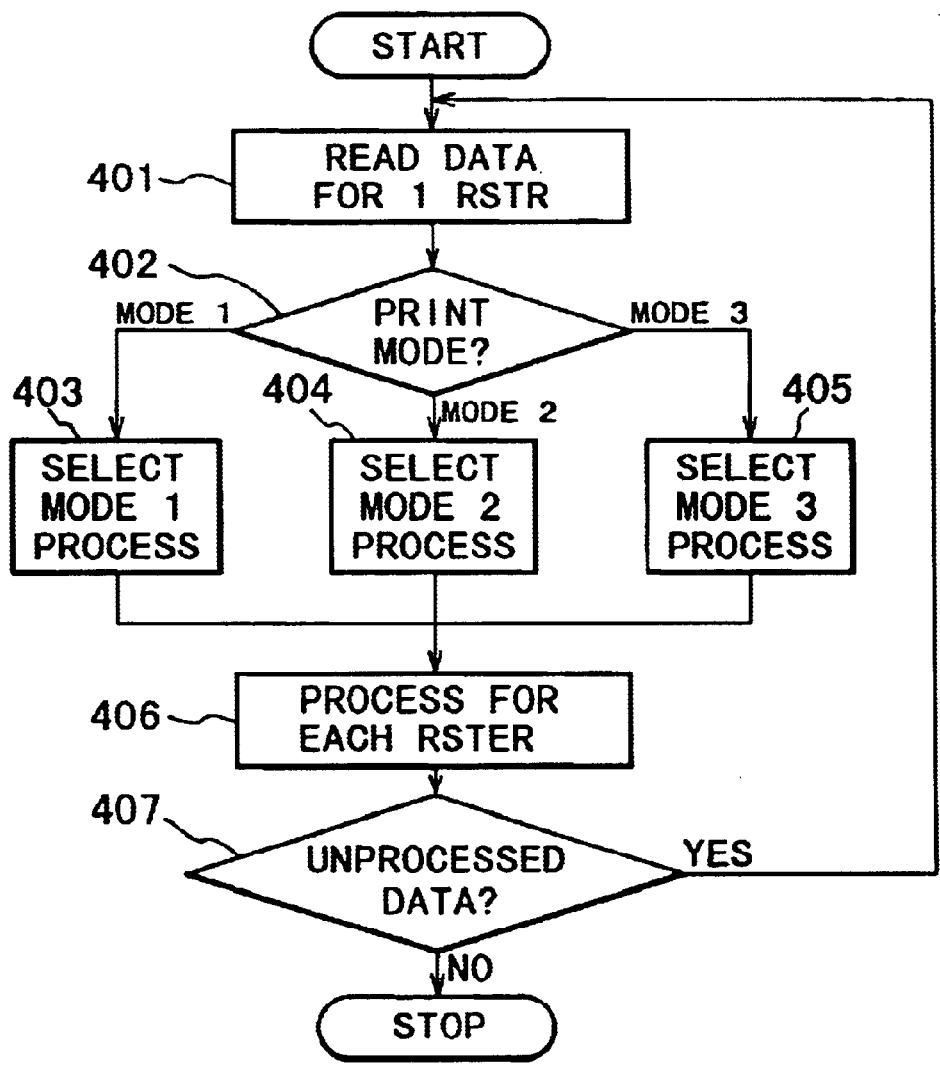
FIG. 20 is a flow chart showing an algorithm in the host computer when the printing mode of a printer is simulated, and the recording elements are assigned to the raster line lines.

FIG. 20 shows an example of an algorithm in which the recording operation of the printer 2 of this embodiment is simulated, and the image processing is effected for each raster line.

First at step 401, the image data of one raster line is read in the image data buffer for temporarily storing the data. Then, the discrimination is made as to the printing mode in which the image data read at step 402 is printed. Here, when the printing mode 1 is carried out in t printer 2, the image processing for the printing mode 1 is selected at step 403. Here, the image processing is carried out on the basis of the combination of the recording element corresponding to the raster line in the printing mode 1.

When the printing mode 2 is carried out in the printer 2, the image processing for the printing mode 2 is selected at step 404, and when the printing mode 3 is carried out, the image processing of printing mode 3 is selected at step 405, and the image processing is carried out on the basis of the combination with the correspondence recording element. Subsequently, at step 406, the image processing is effected for each raster line correspondencely to the assigned recording element. Finally, at step 407, the discrimination is made as to whether or not there remains unprocessed image data, and if so, the operation returns to step 401. If not, this algorithm is finished. Thus, by simulation of the recording operation in t printing mode in which the operation is carried out by the printer 2, the recording elements are assigned to the respective raster lines, and the image processings are effected for the respective raster lines.

The information of the density property of each of the recording element is obtained by the host computer 1 through a known method. In an example of the known methods, the density property of each of the recording elements are measured when the recording head is manufactured, and the measured density property is stored in a non-volatile memory recording material such as ROM or the like provided in the recording head, and the stored data therein is fetched by the host computer 1 through a bi-directional interface.

As described in the foregoing, in the printer 2 having a changeable multi-path number in response to the printing mode, the recording operation is simulated by the host computer 1, by which the combination of the recording elements to be used for the printing is assigned to t raster line, and the image processing which is the density correction or the failed-ejection supplementing process here, is accomplished.

Embodiment 6

Embodiment 6 is applied to a method in which when the spread of the inks occurs at the boundary between the black and the color areas due to the properties of the inks, the boundary portion is detected, and the printing mode is changed in the case of the presence of such a boundary.

The description will be made as to the recording method in which the printing mode is changed in accordance with the result of the boundary detection. The recording head has 8 recording elements for each color shown in FIG. 12. In the printer 2 of this embodiment, in view of the presence of the black-color color boundary, the recording operation is determined not on the image data of a single raster line but on image data of a plurality of raster lines. Therefore, the host computer 1 uses an image data buffer for temporarily storing the image data of more than one lines before assigning the recording element to each raster line and simulates the recording operation of the printer 2. The discrimination is made as to whether or not there is a black-color boundary, and on the basis of the result of the discrimination, the printing mode is determined, and in accordance with the determined printing mode, the recording element is assigned to each raster line, and the image processing is effected for each raster line.

Figures 21A, 21B:
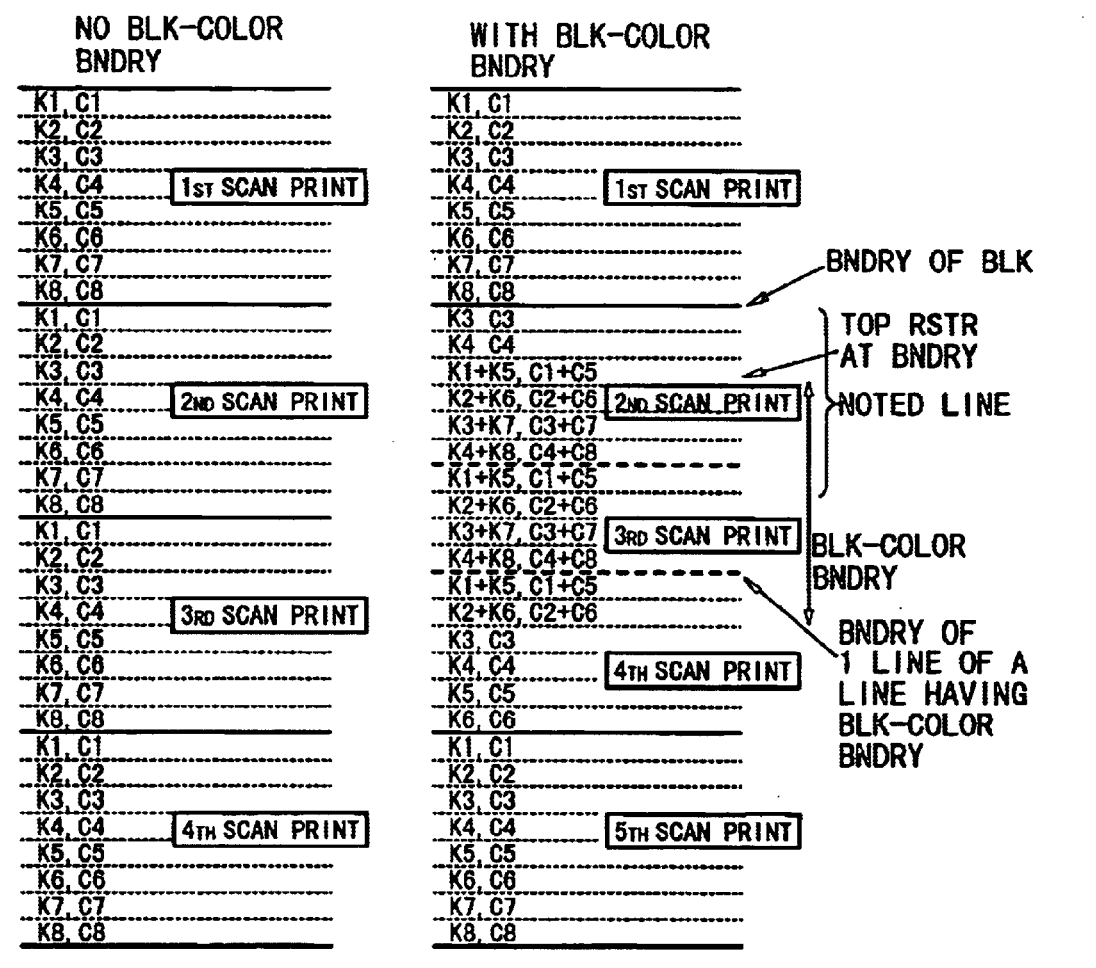

FIG. 21 shows an example of simulation in which the line does not contain the black-color boundary and an example of simulation in which the line contains the black-color boundary. In FIG. 21A which shows the case of the line not containing the black-color boundary, the recording elements K1–K8, C1–C8, M1–M8, Y1–Y8 are assigned to the raster lines in a constant cycle (constant cyclic period) for the respective lines, and the image processing is carried out.

On the other hand, in FIG. 21D in which the black-color boundary is present, when there is no black-color boundary in one line, the recording elements K1–K8, C1–C8, M1–M8, Y1–Y8 are assigned to the raster lines in a constant cycle (constant cyclic period) for the respective lines, and the image processing is carried out, similarly to the above. On the other hand, for the image data area containing the black-color boundary, the raster line having the image data containing the black-color boundary is taken as a first raster line of the 2 path recording, and the image processing is effected for each raster line in accordance with the corresponding recording element.

Here, in the noted line, the top of the black-color boundary is taken as the first raster line, and the recording elements (K1, K5), (C1, G5), (M1, M5) and (Y1, Y5) are assigned. Then, the recording element K3 is assigned to the first raster line of the noted line, and therefore, the range covered by one recording scan for the noted line corresponds to 6 raster line K3–K8.

Figure 22:
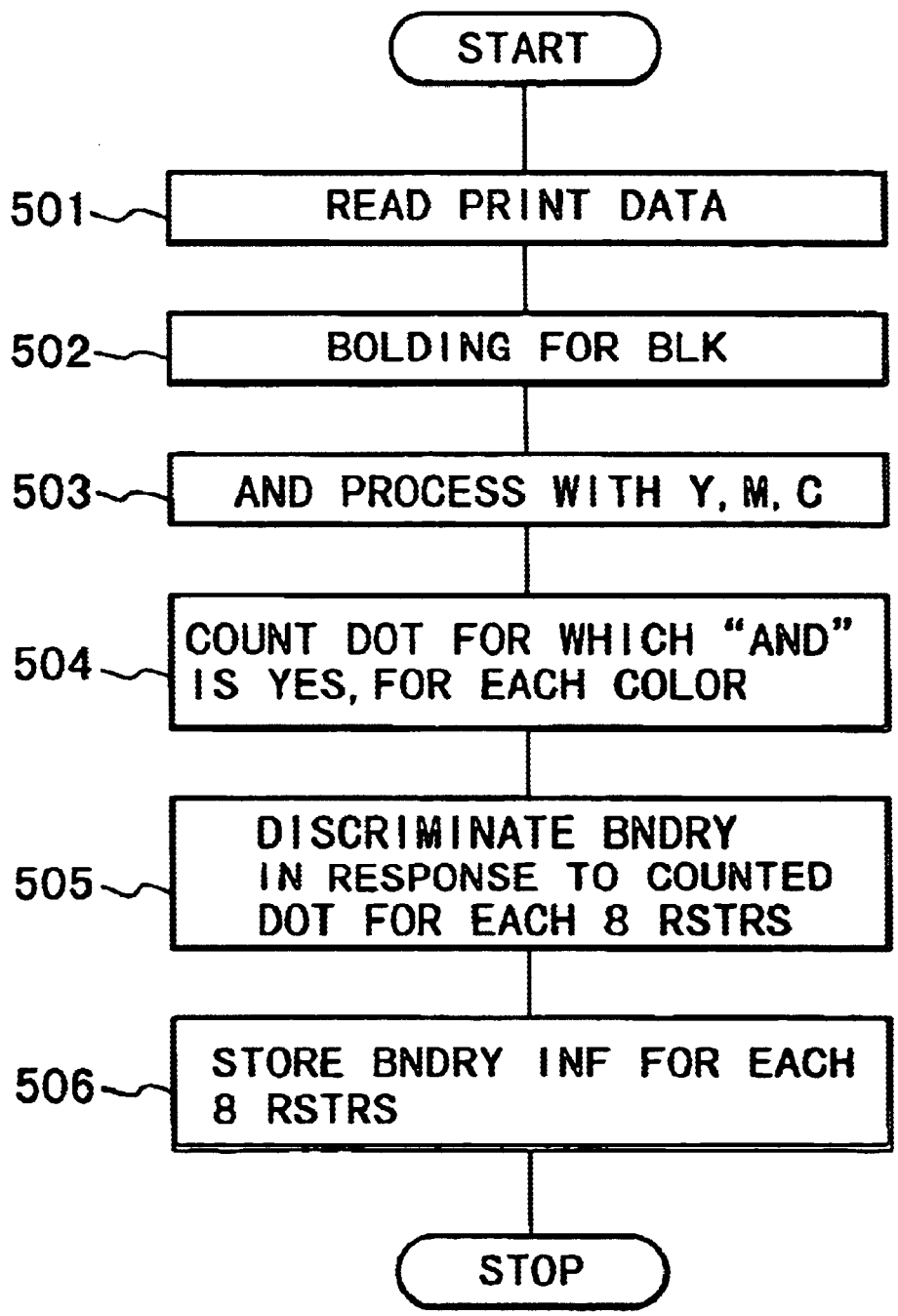
FIG. 22 is a flow chart showing an algorithm for detecting presence or absence of a black-color boundary.

FIG. 22 shows an example of an algorithm for detecting the black-color boundary usable in this embodiment.

First, at step 501, the image data is read in. The amount of the read data is determined in view of the capacity of the data buffer for temporarily storing the image data, and in this embodiment, the image data of 8 raster lines a processed in one routine. Then, at step 502, the black data is subjected to a bolding process correspondencely to the spread of t ink.

Here, the bolding process means an OR process while shifting the data in predetermined directions. In this case, the directions may be upward, downward, left and right, and then, then image data is expanded in these directions, that is, the image data are converted to bolded data. When the amount of bolding is 4 pixels in the upward, downward, leftward and rightward directions, the image data after the bolding correspond to 9×9 pixel, when one original pixel is noted.

At step 503, an AND process for the color data and the black bolding data is carried out.

In this case, the area to be subjected to the AND process corresponds to the image data larger by 4 raster lines than the black data in the upward and downward directions. At step 504, the number of the dots for which the AND is true in the area is counted, and if the count is not less than a predetermined threshold, the 8 raster line is discriminated as being a boundary portion at step 505. At step 506, the boundary information indicative that it is a boundary portion is stored for each 8 raster line, and this algorithm ends.

The description will be made as to an example of an algorithm in which the printing mode is changed in accordance with the boundary information, that is, the information as to whether or not there is a black-color boundary.

Figure 23:
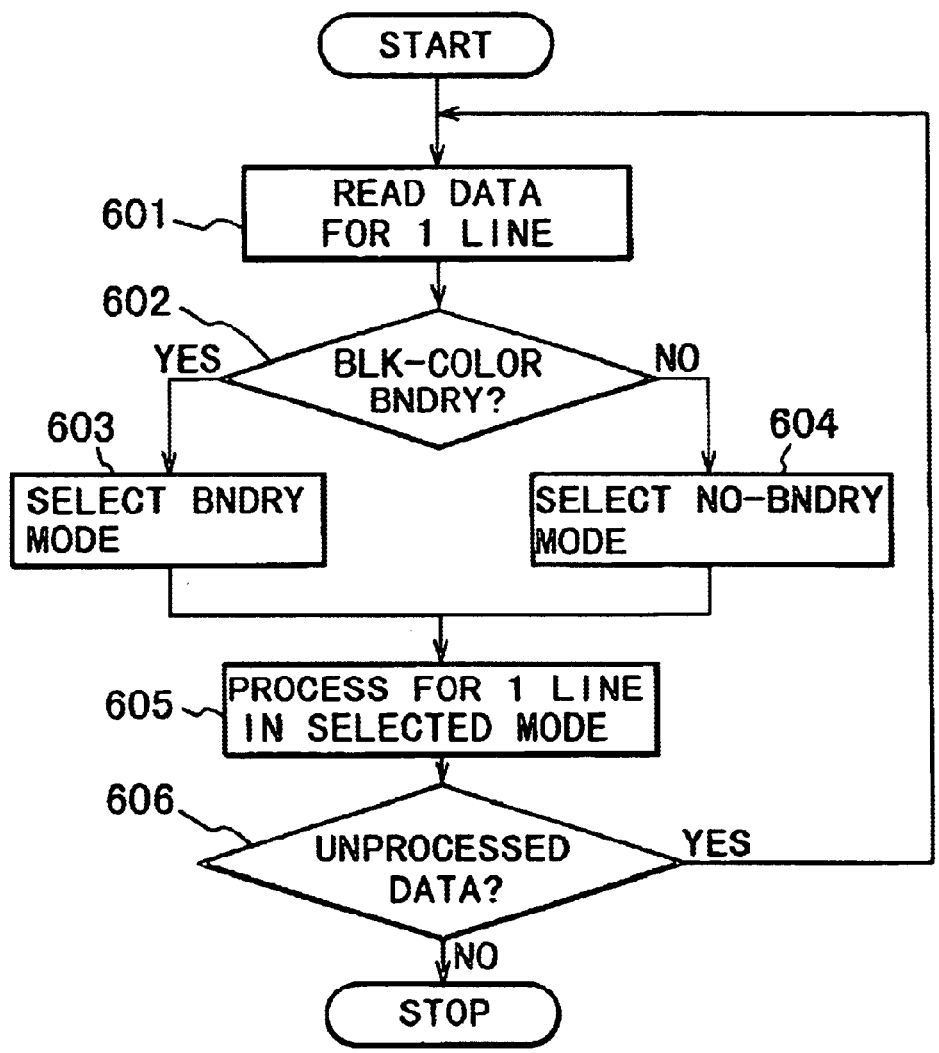
FIG. 23 is a flow chart showing an algorithm for changing a printing mode in response to presence or absence of the black-color boundary.

FIG. 23 shows an example of an algorithm in which the recording operation of a printer 2 in which the printing mode is selected in accordance with the black-color boundary and the recording elements are assigned to the raster lines, and the image processing is effected.

At step 601, the image data of one line is read in an image data buffer for temporarily storing data. Then, the discrimination is made as to whether or not there is a black-color boundary in the image data read at the step 602. If there is any, the printing mode for the boundary is selected at step 603. In accordance with the printing mode, the amount of the sub-scan is determined. If there is no boundary in the image data read at the step 602, the printing mode for the no boundary is selected.

Subsequently, the printing mode selected by the step 605 is simulated, and the image processing is effected for each raster line in response to the recording element assigned to each raster line. Finally, at step 606, the discrimination is made as to whether or not there remains unprocessed image data, and if so, the operation returns to step 601. If not, this algorithm ends.

In this manner, in the printer 2 in which the printing mode is set in accordance with the black-color boundary, the host computer 1 simulates the recording operation of the printer 2, and the recording elements to be used are assigned to the respective raster lines, and the image processings are carried out.

Embodiment 7

Embodiment 7 is application of the present invention to an image processing for each raster line when secondary color is printed in bi-directional printing.

Generally, when the bi-directional printing is carried out for the secondary color with the recording head as shown in FIG. 12, the coloring is different depending on the order of shots of the ink droplets, with the result of unevenness in the color at the intervals of the amount of feeding in the sub-scan direction. This is because in the case that after an ink is ejected, and then another ink is overlaid thereon, the latter ink tends to go deeper into the thickness of the sheet than the former ink, in the overlaid area.

Figure 24:
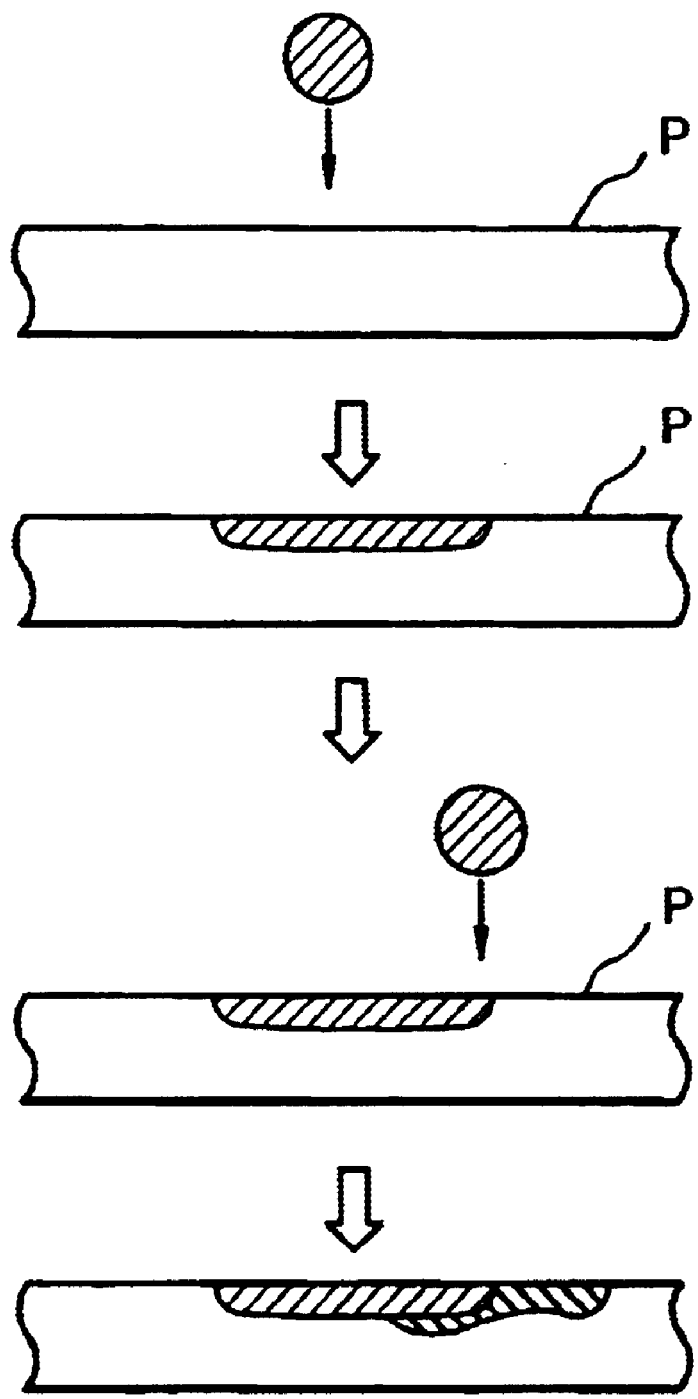
FIG. 24 is an illustration of a phenomenon of sinking of post-ejected ink.

FIG. 24 schematically shows the phenomenon. When the coloring material such as dye or the like in the ejected ink is physically and chemically bonded with the recording material, bonding is not limitless, and therefore, unless there is a significant difference between the coloring materials in the binding power, the bonding between the recording material and the coloring material of the ink early ejected first occurs and remains more in the surface portion. The coloring material of the latter ink is not easily bonded at the surface of the recording material, and is bonded after going deep into the thickness of the recording material. Looking at the behavior of the ink in connection with the fibers of the recording material therein, the fibers once bonded with the dye or the like in the ink, has a stronger hydrophilicity than the non-bonded fibers, and therefore, the ink droplet arrived adjacent this high hydrophilic portion tends to be attracted toward the earlier ink portion.

Figure 25:
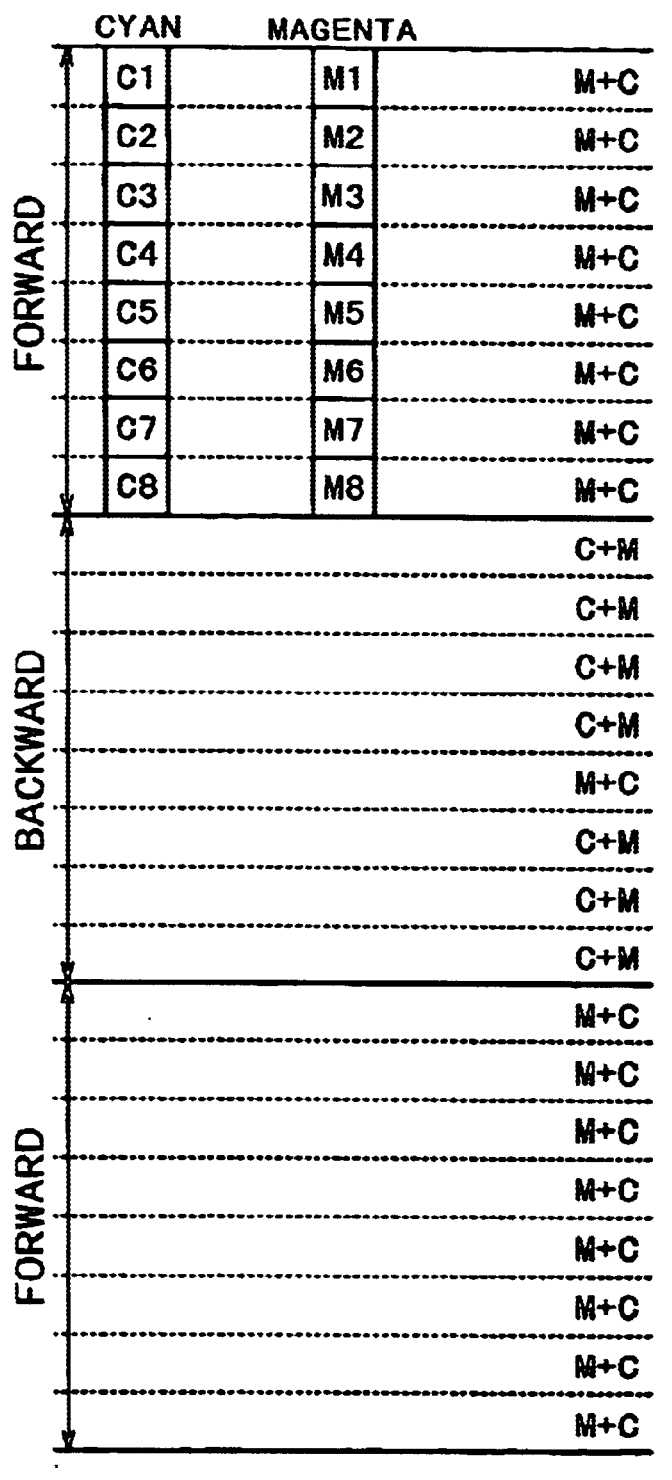

FIG. 25 shows an example in which the secondary color (blue) is printed in a bi-directional printing. The recording heads are for the cyan and magenta colors for simplicity. A reciprocal printing is carried out using the two recording heads, and in the forward printing, the recording is carried out in the order of magenta and then cyan on the recording material. By doing so, a magenta rich blue color is provided. On the other hand, the recording is effected in the order of cyan and then magenta. By doing so, a cyan rich blue is provided.

In order to make the color tone match each other, the density correcting process is effected to the early shot recording elements of magenta color in the raster line of forward printing to suppress the density. On the other hand, for the raster line of the backward recording, the density correction is carried out for the recording elements of cyan color already shot to suppress the density. By doing so, in the case of the reciprocal printing of secondary color, the amount of the leading ink is made smaller, that is, the density is suppressed, by which the color non-uniformity can be suppressed.

The color unevenness attributable to the printing may be corrected through changing another method such as a color conversion process such as UCR (background color removal) or masking process in place of the density correcting process.

As described hereinbefore in connection with Embodiment 1, in order to improve the recording speed, some printer 2 skips null raster if any, and effect only the sheet feeding. In that case, the correspondence between the raster lines and the recording elements to be used for the printing is disturbed. To avoid the disturbance, this embodiment simulates the null raster skip carried out by the printer 2.

More particularly, in this embodiment, the host computer 1 simulates the null raster skip operation of the printer 2 to assure the correspondence between the raster lines of the forward printing and the recording elements used for the recording of the raster lines of the backward recording. The simulation for the null raster skip is the same as the foregoing embodiments, and the detailed description thereof is omitted for simplicity.

As described in the foregoing, when the secondary color is printed color in the printer 2 in the reciprocal printing load, and the null raster is skipped with the result that relation between the raster lines and the recording elements used for recording the raster lines depending on the image data is changed, the host computer 1 simulates the image data of the skip in this embodiment, so that recording elements are assigned to the raster lines in the reciprocal printing, and the image processings are carried out, and therefore, the color unevenness of the secondary color can be suppressed.

In the modified example of this embodiment, in place of the printing operation including the null raster skip, a switching operation between the bi-directional printing and the single direction printing in response to a "break" detection is usable. The "break" means the lack of continuity because of existence of null or disconnection between adjacent lines, and this means that even if misregistration occurs between the adjacent lines due to the bi-directional scanning the misregistration is not conspicuous. In view of this, when the "break" is detected, the bi-directional printing is carried out, and in the other cases, the single direction is carried out so that printing quality and the printing speed are both satisfied.

In the modified example, the bi-directional printing operation on the basis of the "break" detection of the printer 2 is simulated, so that discrimination is made as to whether the line is printed in the forward path or backward passage, and on the basis of the result of the discrimination, the image processing is carried out by the host computer 1. According to this modified example, even in the case that printer 2 capable of reciprocal printing carries out selective bi-directional or single direction printing, and the relation between the raster lines and the recording elements used for the recording thereof changes, the host computer 1 simulates the recording operation of the printer 2, so that recording elements are assigned to the raster lines in the reciprocal printing, and the image processings are carried out on the basis of the assignment, and therefore, the color unevenness can be suppressed.

10211 in the foregoing embodiments of the present invention, the description has been made with respect to the simulation of the host computer 1 when the recording operation of the printer 2 changes due to the multi-path printing, the null raster skip, the color containing image, the black-color boundary image or the "break" image, and therefore, the correspondence between the raster lines and the recording elements to be used for the recording of the raster lines. However, the present invention is not limited to these cases. For example, those cases may be combined. Alternately, the simulation may be made for the change of the recording operation of the printer 2 in accordance with the ambient condition for the printer 2 for example the government ambient temperature and/or humidity, the change of the recording operation in accordance with the recording mode selected by the switch or the printer driver of the printer 2, that is, the change of the recording operation of the printer 2 due to the condition other than the image data. More particularly, when the printer 2 changes its recording operation in accordance with a beaten condition, the host computer 1 obtains the condition, and simulates the recording operation of the printer 2.

In the foregoing embodiments, the image processing corresponding to the raster line, the density correcting process, the UCR process or masking process is taken, but a tone scale correction (γcorrection) process may be taken depending on the purpose of the process.

According to the foregoing embodiments, the image quality of the printer 2 capable of various modes of the recording operation can be improved by modifying the host computer 1, more particularly, the printer driver without necessity of making any substantial change to the printer 2, so that present invention can accommodate a version up or the like of the without difficulty.

Other Embodiments

The present invention is applicable to a single machine such as a copying machine or facsimile machine, and a system comprising a plurality of machines such as a host computer, an interface equipment, a reader, printer or the like.

Program codes of a software for accomplishing the function of any one of the foregoing embodiments may be supplied to an apparatus connected with various devices or to a computer in the system to operate the devices so that functions of any one of the foregoing embodiments are performed, and the various devices are operated in accordance with the program stored in the system or in the computer (CPU or MPU) of the device.

Therefore, an aspect of the present invention covers the program codes per se of the said software which perform the function of any one of the foregoing embodiments, any means for supplying the program codes to the computer, for example, memory medium storing the program codes, for example.

The memory medium for storing the program codes include, both of, a floppy disk, a hard disk, an optical disk, a magneto-optical disk, a CD-ROM a magnetic tape, a non-volatile memory memory card, ROM or the like.

Also, the present invention covers the program codes not only the case in which the functions of any one of the foregoing embodiments are accomplished by executing the program codes supplied to the computer but also the case in which the functions of any one of the foregoing embodiments are accomplished by the OS (operating system) of the computer operating the program codes or are accomplished in cooperation with another application software or the like.

Furthermore, the program codes may be stored in the memory provided in a function expanding board of the computer or a function expanding unit connected with the computer, and then a part or all of the actual processing is carried out by the CPU or the like provided in the function expanding board or the function expanding unit in accordance with the instructions of the program codes to effect the above desired functions.

As described in the foregoing, according to the present invention, there is provided an image data transfer method for transferring image data to a recording device for effecting an image recording in accordance with the image data using a recording head having a plurality of recording elements, said method comprising a step of simulating a recording operation of the recording device in accordance with a predetermined condition; a step of providing correspondence between raster lines of the image data and recording elements to be used for recording the raster lines on the basis of a result of said simulating step; a step of effecting an image processing the image data for each raster lines having been made to correspond to the recording elements by said correspondence providing step; a step of transferring the image data having been subjected to the image processing to the recording device. The image quality of the printer 2 capable of various modes of the recording operation can be improved by modifying the host computer 1, more particularly, the printer driver without necessity of making any substantial change to the printer 2, so that present invention can accommodate a version up or the like of the without difficulty.

While the invention has been described with reference to the structure disclosed herein, it is not confined to the details set forth and this application is intended to cover such modifications or changes as may come within the purposes of the improvements or the scope of the following claims.

While the invention has been described with reference to the structures disclosed herein, it is not confined to the details set forth and this application is intended to cover such modifications or changes as may come within the purpose of the improvements or the scope of the following claims.

What is claimed is:

1. An image data transfer method for transferring image data to a recording device for effecting an image recording in accordance with the image data using a recording head having a plurality of recording elements, said method comprising:

a step of simulating a recording operation of the recording device in accordance with a predetermined condition;

a step of providing correspondence between raster lines of the image data and recording elements to be used for recording the raster lines on the basis of a result of said simulating step;

a step of effecting an image processing the image data for each raster lines having been made to correspond to the recording elements by said correspondence providing step; and a step of transferring the image data having been subjected to the image processing to the recording device.

2. A method according to claim 1, wherein said simulation step includes simulating a multi-path printing of the recording device, which records each raster line by a plurality of main-scannings of said recording head, and wherein said correspondence providing step includes providing the correspondence between each raster line of the image data and a combination of the recording elements to be used for recording the raster line as a result of the simulation of said simulation step, and said image processing step includes effecting a density correction of the image data of each raster line on the basis of information of the combination of the recording elements.

3. A method according to claim 2, wherein said simulating step includes simulating a multi-path printing of the recording device, in which each raster line is recorded by a plurality of main-scannings while a sub-scan of an amount corresponding to an integer reciprocal of a number of the recording elements.

4. A method according to claim 3, wherein said simulating step includes simulating a multi-path printing of the recording device in accordance with an image mode.

5. A method according to claim 1, wherein said simulating step includes simulating a recording operation of the recording device which changes in accordance with the image data.

6. A method according to claim 5, wherein said simulating step includes simulating a null skip operation of the recording device, in which a null raster of raster lines is skipped without carried out scanning of said recording head.

7. A method according to claim 6, wherein said image processing step includes effecting the density correction of the image data for each raster line that has been made to correspond to the recording element on the basis of information of the recording element.

8. A method according to claim 5, wherein said simulating step includes simulating a null skip operation of the recording device which comprises a plurality of the recording heads capable of effecting image recording in a plurality of colors, and which is capable of effecting the image recording in each of reciprocal' scannings and is capable of skipping a null raster of the raster lines without effecting scanning of the recording heads, and wherein said image processing step includes effecting the image processings of the image data for the respective raster lines in accordance with a recording direction of the raster lines that have been made to correspond to the recording elements.

9. A method according to claim 5, wherein said simulating step includes simulating a bi-directional recording operation of the recording device which comprises a plurality of said recording heads capable of effecting image recording in a plurality of colors and which is capable of effecting the image recording in each of reciprocal scannings of the recording heads in which the recording direction is determined on the basis of a break between scanning lines, and wherein said image processing step includes effecting the image processing of the image data of the raster line in accordance with the recording direction of the raster line that has been made to correspond to the recording element.

10. A method according to claim 5, wherein said simulating step includes simulating the recording operation of the recording device which comprises a plurality of the recording heads capable of effecting image recording in a plurality of colors and in which a recording operation changes in accordance with black image and color containing image.

11. A method according to claim 10, wherein said simulating step includes simulating the recording operation of the recording device in which the recording head for the black recording and the recording head for the color recording have different numbers of recording elements and in which the recording operation changes in accordance with black image data and color containing image data.

12. A method according to claim 5, wherein said simulating step includes simulating the recording operation of the recording device which comprises a plurality of the recording heads capable of effecting image recording in a plurality of colors and in which the recording operation changes in accordance with a boundary between black image data and color image data.

13. A method according to claim 1, wherein said simulating step includes simulating the recording operation of the recording device in which recording operation changes with change of an ambient condition.

14. A method according to claim 1, wherein the recording head ejects ink for the recording.

15. A recording material storing a program which is readable by an information processing device, said program being capable of executing an image data transfer method for transferring image data to a recording device for effecting an image recording in accordance with the image data using a recording head having a plurality of recording elements, said method comprising:

a step of simulating a recording operation of the recording device in accordance with a predetermined condition;

a step of providing correspondence between raster lines of the image data and recording elements to be used for recording the raster lines on the basis of a result of said simulating step;

a step of effecting an image processing the image data for each raster lines having been made to correspond to the recording elements by said correspondence providing step; and a step of transferring the image data having been subjected to the image processing to the recording device.

16. An image data processing method for processing image data to be transferred to a recording device for effecting an image recording in accordance with the image data using a recording head having a plurality of recording elements, said method comprising:

a step of simulating a recording operation of the recording device in accordance with a predetermined condition;

providing correspondence between raster lines of the image data and recording elements to be used for recording the raster lines on the basis of a result of said simulating step; and a step of effecting an image processing the image data for each raster lines having been made to correspond to the recording elements by said correspondence providing step.

17. A method according to claim 16, wherein said simulation step includes simulating a multi-path printing of the recording device which records each raster line by a plurality of main-scannings of said recording head, said correspondence providing step includes providing the correspondence between each raster line of the image data and a combination of the recording elements to be used for recording the raster line as a result of the simulation of said simulation step, and said image processing step includes effecting a density correction of the image data of each raster line on the basis of information of the combination of the recording elements.

18. A method according to claim 17, wherein said simulating step includes simulating a multi-path printing of the recording device in which each raster line is recorded by a plurality of main-scannings while a sub-scan of an amount corresponding to an integer reciprocal of a number of the recording elements.

19. A method according to claim 18, wherein said simulating step includes simulating a multi-path printing of the recording device in accordance with an image mode.

20. A method according to claim 16, wherein said simulating step includes simulating a recording operation of the recording device which changes in accordance with the image data.

21. A method according to claim 20, wherein said simulating step includes simulating a null skip operation of the recording device, in which a null raster of raster lines is skipped without performance of scanning of the recording head.

22. A method according to claim 21, wherein said image processing step includes effecting the density correction of the image data for each raster line having been made to correspond to the recording element on the basis of information of the recording element.

23. A method according to claim 20, wherein said simulating step includes simulating a null skip operation of the recording device which comprises a plurality of the recording heads capable of effecting image recording in a plurality of colors, and which is capable of effecting the image recording in each of reciprocal scannings and is capable of skipping a null raster of the raster lines without effecting scanning of the recording heads, and wherein said image processing step includes effecting the image processings of the image data for the respective raster lines in accordance with a recording direction of the raster lines having been made to correspond to the recording elements.

24. A method according to claim 20, wherein said simulating step includes simulating a bi-directional recording operation of the recording device which comprises a plurality of the recording heads capable of effecting image recording in a plurality of colors and which is capable of effecting the image recording in each of reciprocal scannings of the recording heads in which the recording direction is determined on the basis of a break between scanning lines, and wherein said image processing step includes effecting the image processing of the image data of the raster line in accordance with the recording direction of the raster line having been made to correspond to the recording element.

25. A method according to claim 20, wherein said simulating step includes simulating the recording operation of the recording device which comprises a plurality of the recording heads capable of effecting image recording in a plurality of colors and in which a recording operation changes in accordance with black image and color containing image.

26. A method according to claim 25, wherein said simulating step includes simulating the recording operation of the recording device in which the recording head for the black recording and the recording head for the color recording have different numbers of recording elements and in which the recording operation changes in accordance with black image data and color containing image data.

27. A method according to claim 20, wherein said simulating step includes simulating the recording operation of the recording device, which comprises a plurality of the recording heads capable of effecting image recording in a plurality of colors and in which the recording operation changes in accordance with a boundary between black, image data and color image data.

28. A method according to claim 16, wherein said simulating step includes simulating the recording operation of the recording device in which recording operation changes with change of an ambient condition.

29. A method according to claim 16, wherein the recording head ejects ink for the recording.

30. A recording material storing a program which is readable by an information processing device, said program being capable of executing an image data processing method for processing image data to be transferred to a recording device for effecting an image recording in accordance with the image data using a recording head having a plurality of recording elements, said method comprising:

a step of simulating a recording operation of the recording device in accordance with a predetermined condition;

a step of providing correspondence between raster lines of the image data and recording elements to be used for recording the raster lines on the basis of a result of said simulating step; and a step of effecting an image processing the image data for each raster lines having been made to correspond to the recording elements by said correspondence providing step.

* * * * *